(12) United States Patent
Liu et al.

(10) Patent No.: US 12,537,053 B2
(45) Date of Patent: Jan. 27, 2026

(54) SRAM-BASED IN-MEMORY COMPUTING MACRO USING ANALOG COMPUTATION SCHEME

(71) Applicant: Intel Corporation, Santa Clara, CA (US)

(72) Inventors: Renzhi Liu, Portland, OR (US); Hechen Wang, Portland, OR (US); Richard Dorrance, Hillsboro, OR (US); Deepak Dasalukunte, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 665 days.

(21) Appl. No.: 17/816,442

(22) Filed: Aug. 1, 2022

(65) Prior Publication Data

US 2022/0366968 A1 Nov. 17, 2022

(51) Int. Cl.
*G11C 11/419* (2006.01)
*G06F 7/544* (2006.01)
*G11C 11/408* (2006.01)
*G11C 11/4094* (2006.01)
*G11C 11/4096* (2006.01)

(52) U.S. Cl.
CPC ........ *G11C 11/4096* (2013.01); *G06F 7/5443* (2013.01); *G11C 11/4085* (2013.01); *G11C 11/4094* (2013.01)

(58) Field of Classification Search
CPC ............... G06F 7/5443; G11C 11/4096; G11C 11/4085; G11C 11/4094; G11C 11/41–419
See application file for complete search history.

(56) References Cited

PUBLICATIONS

Wang et al., "A 32.2 TOPS/W SRAM Compute-in-Memory Macro Employing a Linear 8-bit C-2C Ladder for Charge Domain Computation in 22nm for Edge Inference," 2022 IEEE Symposium on VLSI Technology and Circuits (VLSI Technology and Circuits), 2022, pp. 36-37.

*Primary Examiner* — Alfredo Bermudez Lozada
(74) *Attorney, Agent, or Firm* — Akona IP PC

(57) ABSTRACT

Technology for generating an SRAM-based in-memory computing macro includes replacing a SRAM cell cluster defined by a generic SRAM macro with a single-bit multi-bank cluster, the single-bit multi-bank cluster including a plurality of CiM SRAM cells and a plurality of C-2C capacitor ladder cells, arranging a plurality of single-bit multi-bank clusters to form a multi-bit multi-bank cluster, and arranging a plurality of multi-bit multi-bank clusters into a multi-dimensional MAC computational unit within a region of the generic SRAM macro, where an output of at least two of the multi-bit multi-bank clusters are electrically coupled to form an output analog activation line, and where a plurality of bit lines and a plurality of word lines remain at the same grid locations as provided in the generic SRAM macro. Embodiments include arranging a plurality of multi-dimensional MAC computational units into an in-memory MAC computing array.

25 Claims, 13 Drawing Sheets

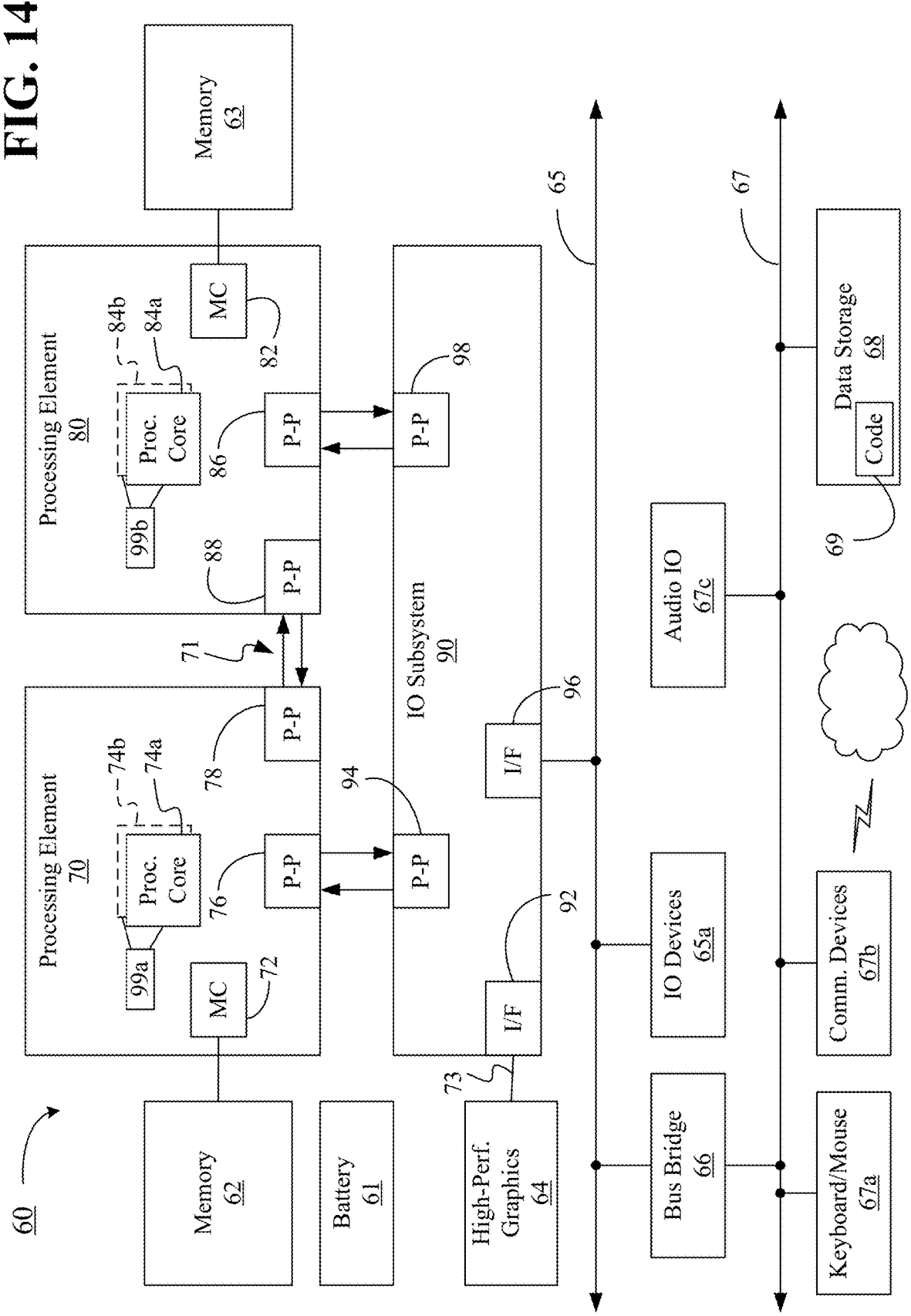

SRAM-BASED IN-MEMORY COMPUTING MACRO USING ANALOG COMPUTATION SCHEME

TECHNICAL FIELD

Embodiments generally relate to compute-in-memory architectures. More particularly, embodiments relate to macros for in-memory MAC architectures that include an integrated MAC unit and memory cell.

BACKGROUND

Some architectures (e.g., non-Von Neumann computation architectures) consider using "Compute-in-Memory" (CiM) techniques to bypass von Neumann bottleneck data transfer issues and execute convolutional neural network (CNN) as well as deep neural network (DNN) applications. The development of such architectures is challenging in digital domains since multiply-accumulate (MAC) operation units of such architectures are too large to be squeezed into high-density Manhattan style memory arrays. For example, with static random access memory (SRAM) technology, solutions that are primarily using digital computation schemes can only utilize a small fraction of the entire SRAM memory array for simultaneous computation with multibit data format because the MAC operation units may be magnitudes of order larger than corresponding memory arrays. For example, the digital computational circuit size for multibit data goes up quadratically with the number of bits, whereas the memory circuit size within SRAM array goes up linearly. As a result, only a small number of computational units can be implemented for all-digital solutions, which significantly bottlenecks the overall throughput of in-memory computing. Furthermore, attempts to develop non-digital solutions present additional challenges with the lack of macro tools (such as those macro tools available for developing traditional digital SRAM architectures).

BRIEF DESCRIPTION OF THE DRAWINGS

The various advantages of the embodiments will become apparent to one skilled in the art by reading the following specification and appended claims, and by referencing the following drawings, in which:

FIG. 14 is a block diagram illustrating an example of a multiprocessor-based computing system according to one or more embodiments.

DESCRIPTION OF EMBODIMENTS

Embodiments as described herein provide an SRAM-based in-memory computing macro for an architecture using an analog MAC unit integrated with a SRAM memory cell (which may be referred to as an arithmetic memory cell). As described herein, the technology provides for constructing such an in-memory computing macro based on a generic (e.g., standard) compiled digital SRAM macro. The disclosed technology significantly reduces design and development time and cost for the SRAM-based in-memory computing macro by making use of tools for developing generic (e.g., standard or traditional) digital SRAM units such as generic SRAM macros provided by SRAM compilers, which in turn permits a faster and simpler verification procedure.

For example, a neural network (NN) can be represented as a structure that is a graph of neuron layers flowing from one to the next. The outputs of one layer of neurons can be based on calculations, and are the inputs of the next. To perform these calculations, a variety of matrix-vector, matrix-matrix, and tensor operations are required, which are themselves comprised of many MAC operations. Indeed, there are so many of these MAC operations in a neural network, that such operations may dominate other types of computations (e.g., activation and pooling functions). Therefore, the neural network operation is enhanced by reducing data fetches from long term storage and distal memories separated from the MAC unit. Thus, embodiments herein provide macros based on merged memory and MAC units to reduce longer latency data movement and fetching, particularly for neural network applications.

Further, some embodiments provide for analog based mixed-signal computing, which is more efficient than digital (e.g., at low precision), to reduce data movement costs in conventional digital processors and circumvent energy-hungry analog to digital conversions. Embodiments as described herein provide technology for executing multi-bit operations based on the analog signals, utilizing a C-2C ladder based analog MAC unit for multibit compute-in-memory architecture (e.g., SRAM among others).

Figure 1A:
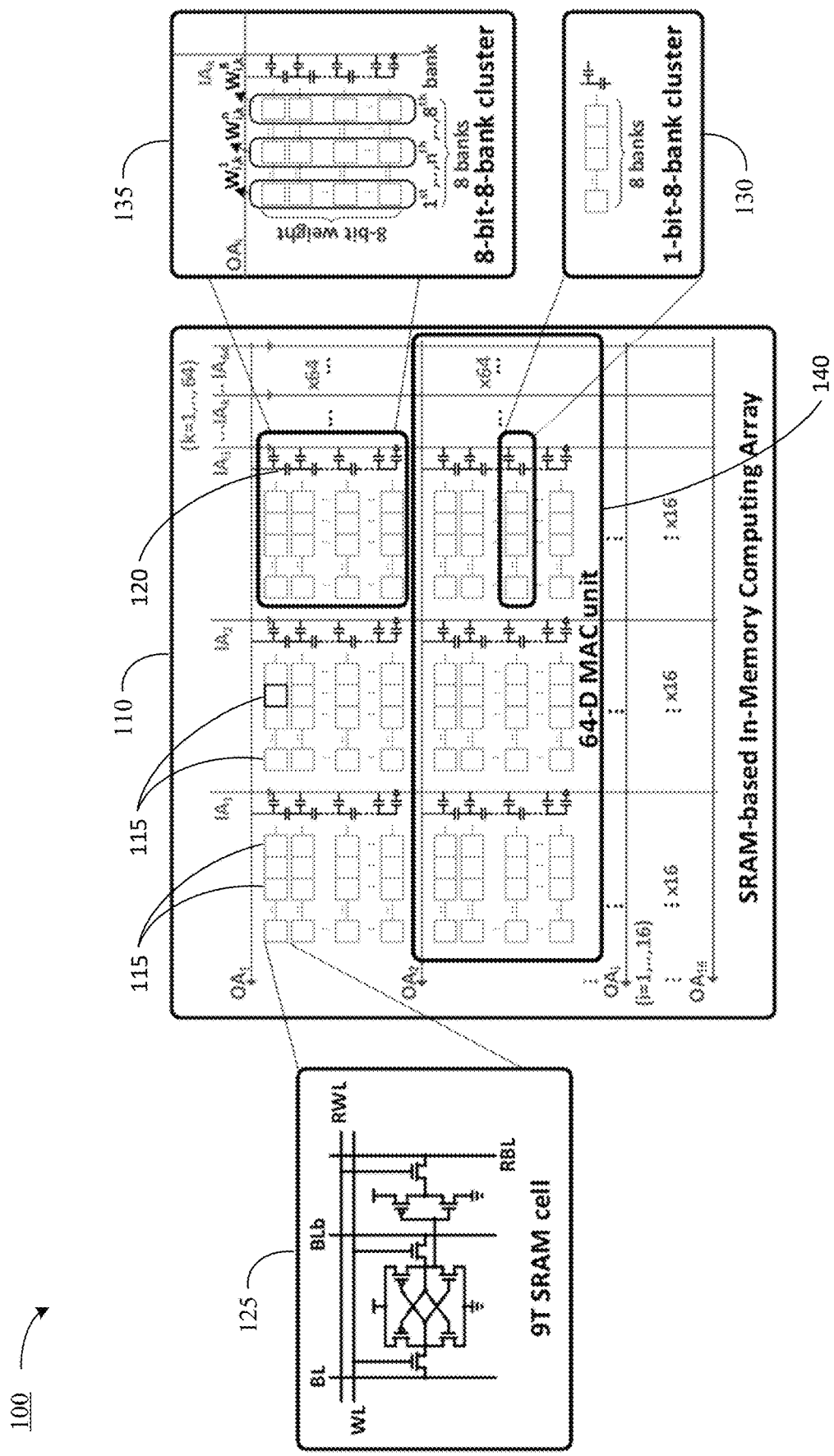
FIG. 1A provides a diagram illustrating an example of a SRAM-based in-memory computing array architecture according to one or more embodiments.

FIG. 1A provides a diagram 100 illustrating an example of a SRAM-based in-memory computing array architecture 110 according to one or more embodiments, with reference to components and features described herein including but not limited to the figures and associated description. Embodiments as described herein are applicable for storing weights for an SRAM-based in-memory computing array having, e.g., an 8-bit data format, although other data formats can be accommodated. As shown in FIG. 1A, the SRAM-based in-memory computing array 110 includes a series of memory cells 115 (e.g., compute-in-memory cells) and a series of C-2C ladder arrays 120. The memory cells 115 and C-2C ladder arrays 120 are, in embodiments, arranged in a series of MAC units. In embodiments, the memory cells 115 include a 9-transistor SRAM cell 125 (e.g., a 9 T compute-in-memory SRAM cell). The 9-transistor SRAM cell 125 can support weight stationary neural network accelerator architectures with localized data multiplexing. In some embodiments, the memory cells 115 include other SRAM memory cells (such as, e.g., a 6-transistor SRAM cell).

Memory cells 115 can be grouped into building blocks or clusters, such as a 1-bit 8-bank cluster 130 containing 8 memory cells 115. The 8 memory cells share one C-2C based computational unit (a portion of a C-2C ladder array 120). Eight 1-bit 8-bank clusters 130 can be grouped (e.g., stacked) vertically into larger building blocks such as 8-bit 8-bank clusters 135 for storing 8-bit weights, for use in weight-stationary NN applications. Each 8-bit 8-bank cluster 135 thus includes a C-2C ladder array 120. The 8 banks of weights in an 8-bit 8-bank cluster 135 can be denoted as $W^n$ ($n \in [1 \ldots 8]$). Such an 8-bit 8-bank cluster 135 performs multiplication between a selected 8-bit weight data (selected from 8 banks) and an input activation (IA) analog value (one of the analog inputs routed into to this array). In the example SRAM-based in-memory computing array 110, each input activation (IA) line is driving vertical sets of 8-bit-8-bank clusters 135 (16 vertical sets of clusters 135 are suggested in the example of FIG. 1A, other numbers or arrangements of vertical sets can be used). Moreover, outputs from horizontal sets of 8-bit-8-bank clusters are electrically coupled (e.g., shorted together) into one output activation (OA) line (64 horizontal sets of clusters 135 are suggested in the example of FIG. 1A, other numbers or arrangements of horizontal sets can be used).

For the example illustrated in FIG. 1A, each output activation $OA_i$ line (e.g., $i \in [1 \ldots 16]$) is derived from a MAC computation according to the following formula:

$$OA_i = \frac{1}{64} \times \sum_{k=1}^{64}[IA_k \times W_{i,k}^n / 2^8]$$  EQ. (1)

where ($n \in [1 \ldots 8]$, $i \in [1 \ldots 16]$, $k \in [1 \ldots 64]$), and where $OA_i$ is the $i^{th}$ output activation line, $IA_k$ is the $k^{th}$ input activation line, and $W_{i,k}^n$ is the selected $n^{th}$ 8-bit weight bank that is from the $i^{th}$ cluster among the 16 sets of vertically stacked 8-bit-8-bank clusters 135 and the $k^{th}$ cluster among the 64 sets of horizontally arrayed 8-bit-8-bank clusters. The $\frac{1}{2^8}$ scaling factor is to normalize the 8-bit weight $W_{i,k}^n$ to a data range of [0, 1].

A series of sixty-four (64) horizontally-arranged 8-bit 8-bank clusters 135 that are computing the 64-dimensional dot product as shown in Eq. (1) can be grouped into, e.g., a 64-D MAC unit 140 (e.g., a larger building block). A plurality of 64-D MAC units (e.g., sixteen (16) such 64-D MAC units 140 as suggested in FIG. 1A) form the SRAM-based in-memory computing array 110. Other numbers of clusters/units and arrangements can be utilized.

Further details regarding MAC units such as can be utilized in the SRAM-based in-memory computing array 110 (including, e.g., for use in the 64-D MAC unit 140) are provided in U.S. patent application Ser. No. 17/485,179 filed on Sep. 24, 2021 and entitled "Analog Multiply-Accumulate Unit For Multibit In-Memory Cell Computing," which is incorporated herein by reference in its entirety. Further details regarding an example compute-in-memory architecture including a 9-transistor SRAM cell such as can be utilized in the SRAM-based in-memory computing array 110 (including the 9-transistor SRAM cell 125) are provided in U.S. patent application Ser. No. 17/855,097 filed on Jun. 30, 2022 and entitled "Weight Stationary In-Memory-Computing Neural Network Accelerator With Localized Data Multiplexing," which is incorporated herein by reference in its entirety.

Figure 1B:
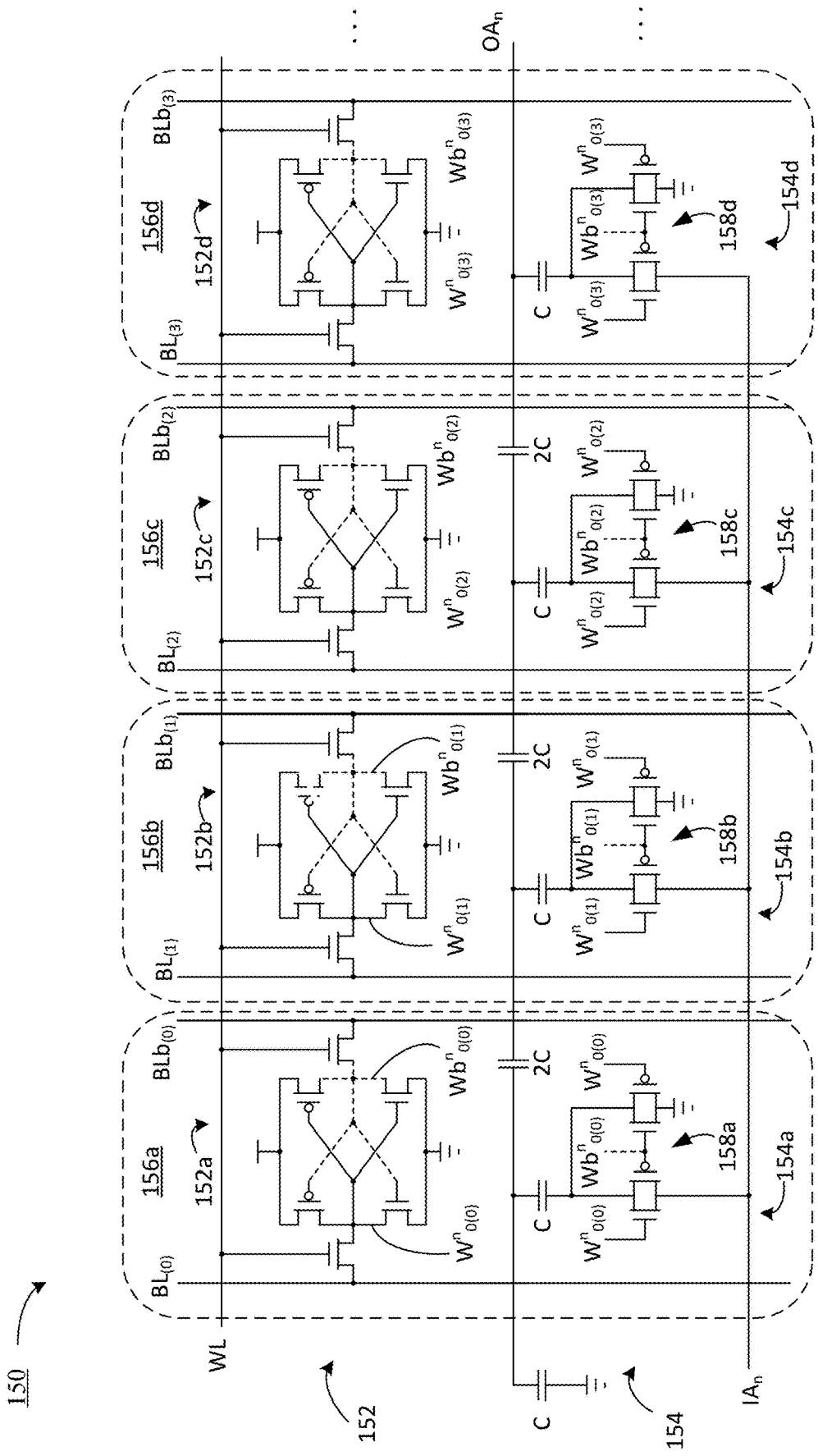
FIG. 1B provides a diagram illustrating an example of an in-memory multiplier architecture according to one or more embodiments.

FIG. 1B provides a diagram illustrating an example of an in-memory multiplier architecture 150 according to one or more embodiments, with reference to components and features described herein including but not limited to the figures and associated description. The in-memory multiplier architecture 150 includes an SRAM memory array 152 and a C-2C ladder-based multiplier 154. The SRAM memory array 152 includes a plurality of memory cells (e.g., compute-in-memory SRAM cells), e.g., 152a, 152b, 152c and 152d. It will be understood that, while four 6-transistor memory cells are shown in FIG. 1B for illustrative purposes, the memory array 152 can include other quantities of memory cells, and that such memory cells can be of varying types—for example, the memory cells 152a, 152b, 152c, 152d, etc. can be 9-transistor memory cells. The C-2C ladder-based multiplier 154 includes a plurality of multipliers, e.g., 154a, 154b, 154c and 154d, having capacitors with a capacitance of C or 2C as shown in FIG. 1B. It will be understood that, while four multipliers are shown in FIG. 1B for illustrative purposes, the C-2C ladder-based multiplier 154 can include other quantities of multipliers, e.g., typically matching the number of memory cells.

Arranged as shown in FIG. 1B, the memory cell 152a and the multiplier 154a form an arithmetic memory cell 156a. Likewise, the memory cell 152b and the multiplier 154b form an arithmetic memory cell 156b, the memory cell 152c and the multiplier 154c form an arithmetic memory cell 156c, and the memory cell 152d and the multiplier 154d form an arithmetic memory cell 156d.

The memory cells 152a, 152b, 152c, 152d, etc. are respectively configured to receive, store and output weight signals $W^n{}_{0(0)}$ and $Wb^n{}_{0(0)}$, $W^n{}_{0(1)}$ and $Wb^n{}_{0(1)}$, $W^n{}_{0(2)}$ and $Wb^n{}_{0(2)}$, and $W^n{}_{0(3)}$ and $Wb^n{}_{0(3)}$. Each of these weight signals represent a digital bit of the weight $W^n$. Weight signals $W^n{}_{0(0)}$ and $Wb^n{}_{0(0)}$ are provided to the memory cell 152a via bit lines $BL_{(0)}$ and $BLb_{(0)}$ upon application of the word line WL (e.g., the voltage of the word line WL exceeds a voltage threshold). Likewise, upon application of the word line WL, weight signals $W^n{}_{0(1)}$ and $Wb^n{}_{0(1)}$ are provided to the memory cell 152b via bit lines $BL_{(1)}$ and $BLb_{(1)}$, weight signals $W''_{0(2)}$ and $Wb''_{0(2)}$ are provided to the memory cell 152c via bit lines $BL_{(2)}$ and $BLb_{(2)}$, and weight signals $W''_{0(3)}$ and $Wb''_{0(3)}$ are provided to the memory cell 152d via bit lines $BL_{(3)}$ and $BLb_{(3)}$. In embodiments, word lines (e.g., WL) can correspond to address information (e.g., address lines), and bit lines can correspond to data (e.g., data lines).

The plurality of multipliers 154a, 154b, 154c, 154d are configured to receive digital signals (e.g., weights such as $W''_{0(0)}$ and $Wb''_{0(0)}$, $W''_{0(1)}$ and $Wb''_{0(1)}$, etc.) from the plurality of memory cells, e.g., 152a, 152b, 152c and 152d of the memory array 152, execute multibit computation operations with the C-2C capacitors based on the digital signals (e.g., weights such as $W''_{0(0)}$ and $Wb''_{0(0)}$, $W''_{0(1)}$ and $Wb''_{0(1)}$, etc.) and (when switched) an input analog signal $IA_n$, and provide an a output analog signal $OA_n$ based on the multibit computations. When used in a neural network, the input analog signal $IA_n$ is an analog input activation signal representing an input to the $n^{th}$ layer of the neural network (e.g., an output signal from the previous layer (n−1) of the neural network), and the output analog signal $OA_n$ is an analog output activation signal representing an output of the $n^{th}$ layer of the neural network (e.g., can be provided as an input to a next layer (n+1) of the neural network). Switches 158a, 158b, 158c and 158d operate to selectively electrically couple the capacitors C in the C-2C ladder array to ground or to the input analog signal $IA_n$ (e.g., input activation signal), based on the respective weights (e.g., weight signals $W''_{0(0)}$ and $Wb''_{0(0)}$, $W''_{0(1)}$ and $Wb''_{0(1)}$, $W''_{0(2)}$ and $Wb''_{0(2)}$, and $W''_{0(3)}$ and $Wb''_{0(3)}$).

Figure 1C:
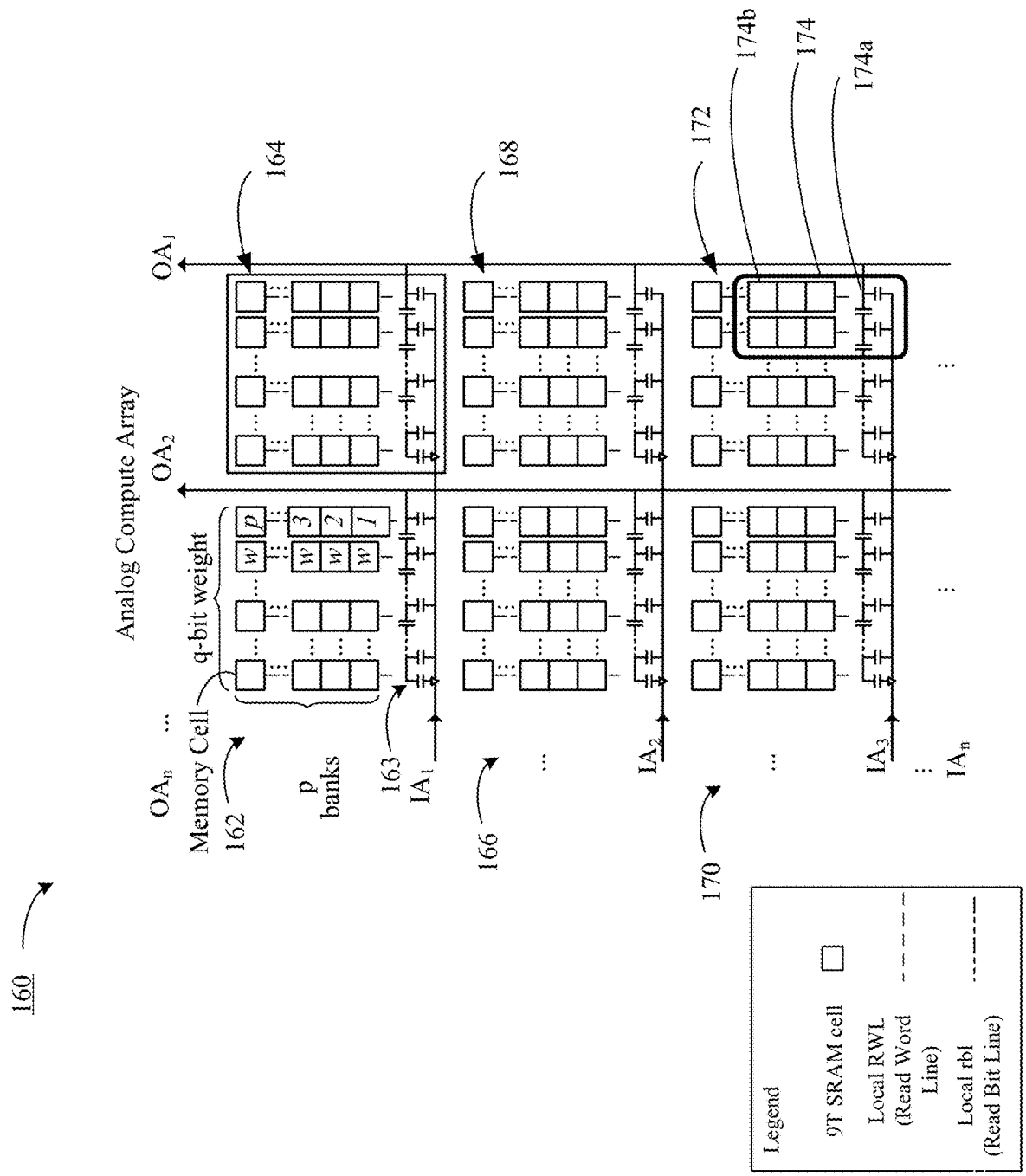
FIGS. 1C-1D provide diagrams illustrating an example of an analog compute architecture according to according to one or more embodiments.
Figure 1D:
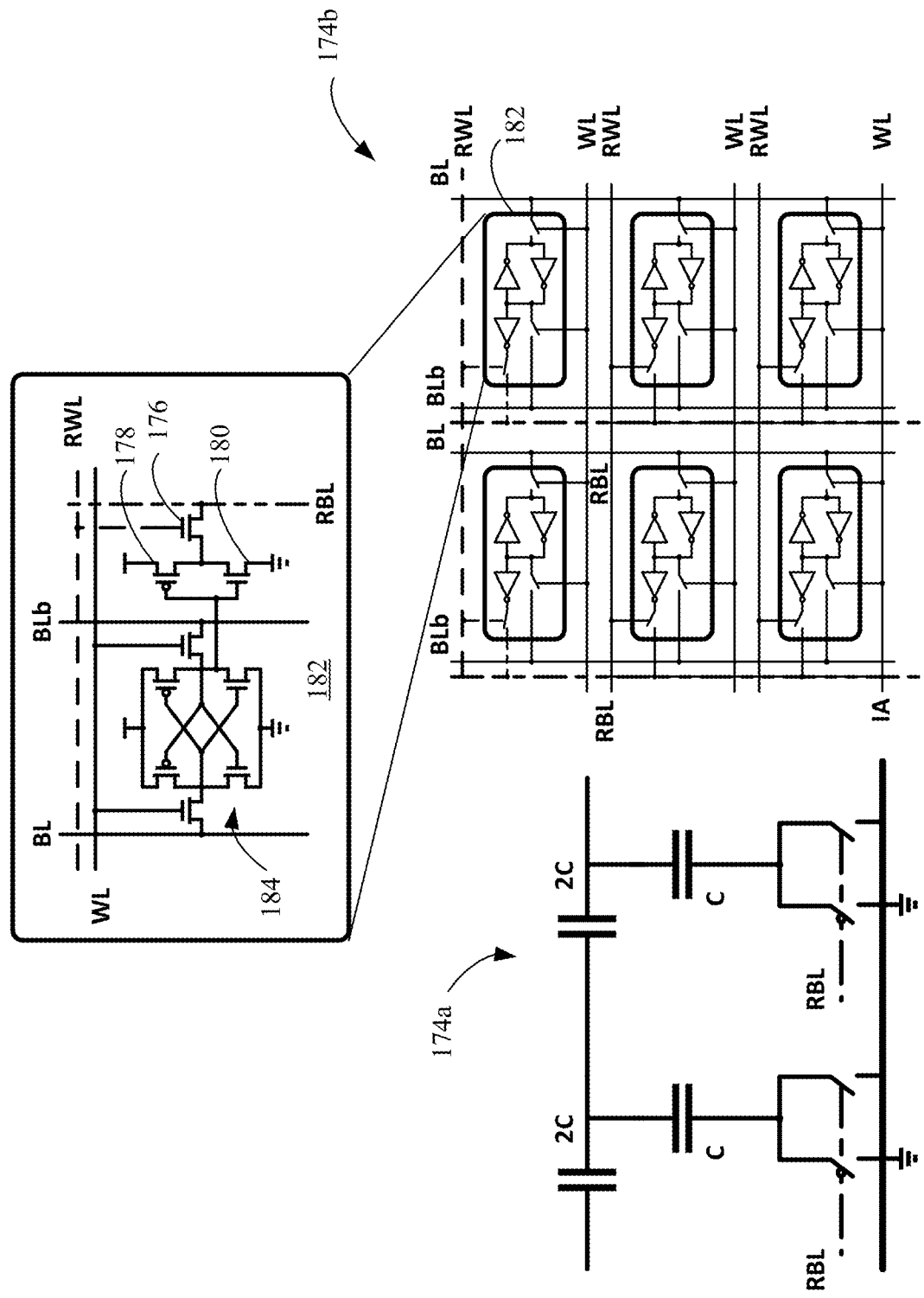

FIGS. 1C-1D provide diagrams illustrating an example of an analog compute architecture 160 according to one or more embodiments, with reference to components and features described herein including but not limited to the figures and associated description. The analog compute architecture 160 can generally implement and/or be combined with the embodiments described herein. For example, the analog compute architecture 160 can be readily substituted for one or more portions of the in-memory computing array architecture 110 (FIG. 1A, already discussed). The analog compute architecture 160 includes a plurality of CiM arrays 162, 164, 166, 168, 170, 172. While the first CiM array 162 is discussed, it will be understood that the other CiM arrays 164, 166, 168, 170, 172 can be similarly formed.

The first CiM array 162 includes p banks that comprise memory cells (represented as squares). Each of the p banks stores a q-bit weight in memory cells (e.g., each memory cell stores one bit of the q-bit weight). A C-2C ladder 163 of the first CiM array 162 receives an input signal $IA_1$. One of the p banks is connected to the C-2C ladder 163 to provide a weight to the C-2C ladder 163. The first CiM array 162 may execute an operation based on the weight and the input signal $IA_1$ to generate an output signal $OA_2$. In the CiM array 172, one read bit line (RBL) (shown as vertical dashed lines running through the memory cells) is connected to the memory cells in one column, and RBLs connect the C-2C ladder 163 to the memory cells.

A portion 174 of the CiM array 172 includes a memory part 174b and a C-2C part 174a. The portion 174 is illustrated in detail in FIG. 1D. As shown in FIG. 1D, the memory part 174b includes a plurality of memory elements including a first memory element 182. The first memory element 182 includes a first transistor 176 that operates as a switch based on the signal from a read word line (RWL). That is, the RWL connects to the gate of the first transistor 176 to place the first transistor into an ON state (i.e., conducting) or OFF state (non-conducting). The first transistor 176 is thus controlled by the RWL.

Second and third transistors 178, 180 are connected to a first side of the first transistor 176. The second and third transistors 178, 180 operate as an inverter. The inverter is inserted to provide better isolation for the data stored in memory cell 184 (e.g., an SRAM) during CiM operations, and eliminates the need of additional peripheral circuits (e.g., the pre-charge pull up logic, sense amplifier and specific timing controller), which leads to a better energy efficiency and reduced circuitry. That is, one side of a latch of the memory cell 184 is tied to an input of the inverter formed by second and third transistors 178, 180, which prevents data stored in the memory cell 184 from being corrupted by external noise and disturbance. The first transistor 176 connects an output of the second and third transistor 178, 180 (i.e., the inverter) and the RBL to provide extra isolation and configurability from data being transmitted over the RBL from other memory cells connected to the RBL.

Thus, some embodiments provide a 9 T SRAM cell illustrated in the first memory element 182. That is, the memory element 182 includes 6 transistors in the memory cell 184, as well as first, second and third transistors 176, 178, 180. The throughput of the CiM computing in embodiments herein is improved since the 9 T structure may support computation and memory writes simultaneously. Embodiments provide a structure of a memory cell to provide additional stability, performance and robustness. In embodiments, the first memory element 182 corresponds to the 9-transistor SRAM cell 125 (FIG. 1A, already discussed).

Figure 1E:
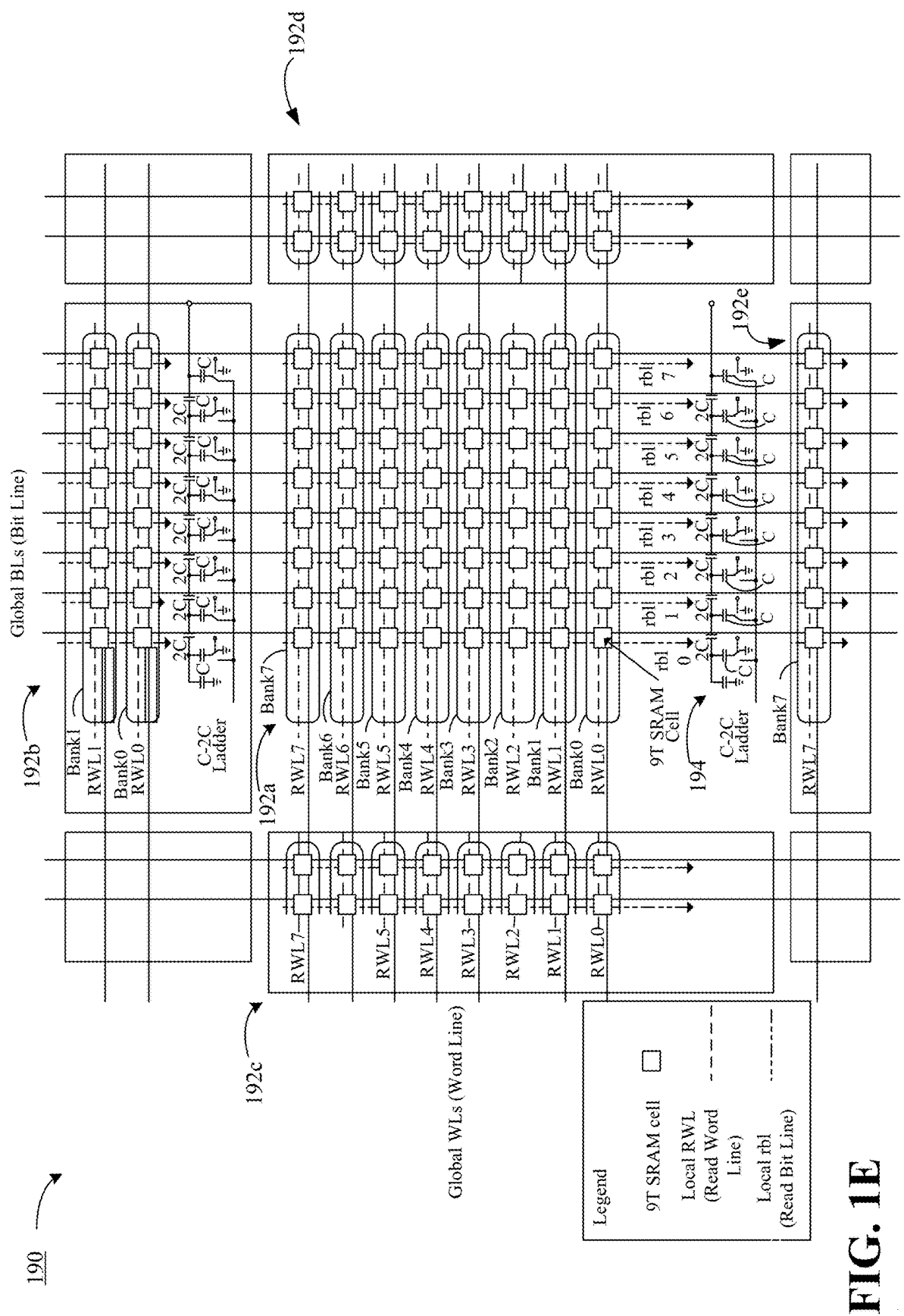
FIG. 1E is a diagram providing a detailed illustration of a compute in-memory architecture according to one or more embodiments.

FIG. 1E is a diagram providing a detailed illustration of a CiM architecture 190. The CiM architecture 190 includes a plurality of memory arrays 192a, 192b, 192c, 192d, 192e as illustrated. The CiM architecture 190 can generally implement the embodiments described herein. For example, the CiM architecture 190 can be readily substituted for one or more portions of the in-memory computing array architecture 110 (FIG. 1A, already discussed).

The plurality of memory arrays 192a, 192b, 192c, 192d, 192e are connected to global word lines and global bit lines to activate different memory cells. Thus, the global word lines and global bit lines electrically connect to the plurality of memory arrays 192a, 192b, 192c, 192d, 192e. In embodiments, each of the memory arrays 192a, 192b, 192c, 192d, 192e can correspond to a multi-bit multi-bank cluster (such as an 8-bit 8-bank cluster 135 in FIG. 1A, already discussed).

The plurality of memory arrays 192a, 192b, 192c, 192d, 192e each include local read word lines (RWLs) that generally extend horizontally. The RWLs carry signals from a controller (not shown) to select different memory banks to connect to a C-2C ladder 194. The first memory array 192a is illustrated in detail, but it will be understood that second, third, fourth and fifth memory arrays 192b, 192c, 192d, 192e are similarly formed.

The first memory array 192a includes banks 0-7 (e.g., memory banks). RWL0-RWL7 extend through and electrically connect to the banks 0-7 respectively. At any one time, only one of the RWL0-RWL7 carries a connection signal to connect a respective bank to the C-2C ladder 194. For example, the controller can generate the connection signal and transmit the connection signal over RWL0 to execute NN operations. Bank 0 will then receive the connection signal over RWL0 and internal transistors (or switches/ MUX) can connect the memory cells of bank 0 to the C-2C ladder 194. The internal transistors can correspond to switching elements. Banks 2-7 would be disconnected from the C-2C ladder 194 during the operation to avoid noise. The memory elements and cells of bank 0, illustrated as the squares labeled as the 9 T SRAM cells, provide data (e.g., weight data) to the C-2C ladder 194 over the read bit lines (rbl) 0-7. The rbls 0-7 generally extend horizontally. The C-2C ladder 194 can then execute the operation (e.g., multiply and accumulate) based on the data and an input signal.

Thereafter, another one of the banks 0-7 can be selected. For example, the controller can provide a connection signal to bank 6 over RWL6 so that bank 6 is electrically connected (e.g., with internal transistors of bank 6) to the C-2C ladder 194. The internal transistors of bank 6 can also correspond to switching elements. The memory cells of bank 6 can then transmit data to the C-2C ladder 194 over rbl0-rbl7. Notably, the banks 0-7 can transmit data to the C-2C ladder 194 over the same rbl0-rbl7 at different times and in a multiplexed fashion. Furthermore, the banks 0-7 operate with the same C-2C ladder 194. It also bears noting that each of the banks 0-7 includes different memory elements and cells arranged on different lines of rbl0-rbl7. Each of the memory elements and cells of a bank of the banks 0-7 represents a different bit of a same data (e.g., weight). For example, the first memory element of bank 0 connected to rbl0 can store a first value for 0 bit position of a first weight, the second memory element of bank 0 connected to rbl1 can store a second value for 1 bit position of the first weight, and so on with the eighth memory element of bank 0 connected to rbl7 storing an eighth value for 8th bit position of the first weight.

In some embodiments, data can be stored into the plurality of memory arrays 192*a*, 192*b*, 192*c*, 192*d*, 192*e* based on timing-related information of the data. For example, suppose that first, second, third and fourth weights are associated with a same first layer of a NN and are identified as likely to serve as inputs to different computations that execute at similar timings (e.g., concurrently). The first, second, third and fourth weights can be dispersed throughout the plurality of memory arrays 192*a*, 192*b*, 192*c*, 192*d*, 192*e*. For example, the first weight can be stored in a bank of the first memory array 192*a*, the second weight can be stored in a bank of the second memory array 192*b*, the third weight can be stored in a bank of the third memory array 192*c* and the fourth weight can be stored in a bank of the fourth memory array 192*d*. Dispersing the first, second, third and fourth weights among the plurality of memory arrays 192*a*, 192*b*, 192*c*, 192*d*, 192*e* can reduce and/or prevent waiting due to a MAC being unavailable (e.g., an operation based on the first weight may need to wait if the MAC is executing an operation based on the second weight).

SRAM-Based in-Memory Computing Macro

An SRAM macro defines an SRAM memory device that includes arrays of memory cells (e.g., bitcells) and the corresponding peripheral circuitry (e.g., address decoders, bit lines, bit line logic and drivers, sense amps, word lines, word line logic and drivers, power lines, and/or SRAM I/O circuits. Thus, a macro specifies not only the memory unit(s) but also all of the peripherals like control block, I/O block, row and column decoders, etc. Embodiments as described herein provide an SRAM-based in-memory computing macro that is based on and converted from a compiled generic (e.g., standard) SRAM macro such as, e.g., generated from an SRAM macro generation tool. Analog multiply-accumulate (MAC) units such as, e.g., described herein with reference to FIGS. 1A-1E are included and, in embodiments, the SRAM memory cell design is modified (e.g., as compute-in-memory SRAM cells) to accommodate the analog MAC units. For example, in embodiments 9-transistor compute-in-memory SRAM cells (e.g., a plurality of 9-transistor SRAM cells 125) are used. In some embodiments, analog MAC units can be incorporated into embedded dynamic random access memory (eDRAM) devices or embedded single level Flash memory devices, where a macro for such devices is converted using the same approach to converting the generic SRAM macros as described herein.

The MAC units and compute-in-memory (CiM) cells are arranged within the SRAM cell array, while keeping the bit lines, word lines and power lines of the SRAM cells at their original grids (e.g., as provided by an SRAM macro generation tool) for pitch matching purposes. With pitch matching, the width and height of the modified SRAM cluster are either the same as the original SRAM cluster, or integer multiples of those of original SRAM cluster. Thus, with the modified SRAM clusters tiled together both vertically and horizontally, this enables reuse of the bit line, word lines and power lines from the original SRAM clusters or, in some embodiments, reuse of some of these lines (as some of those lines become redundant after the SRAM cluster modification) in the modified SRAM cluster with MAC unit embedded. Further, the original SRAM controller circuitry from the compiled SRAM macro, including word line logic and drivers, bit line logics and SRAM I/O circuits are all kept intact and fully reused for the in-memory computing macro. As such, the in-memory computing macro as described herein provides for reduced development times while achieving both high throughput and high efficiency for in-memory compute, and yet is scalable for building large arrays for system integration.

Figure 2:
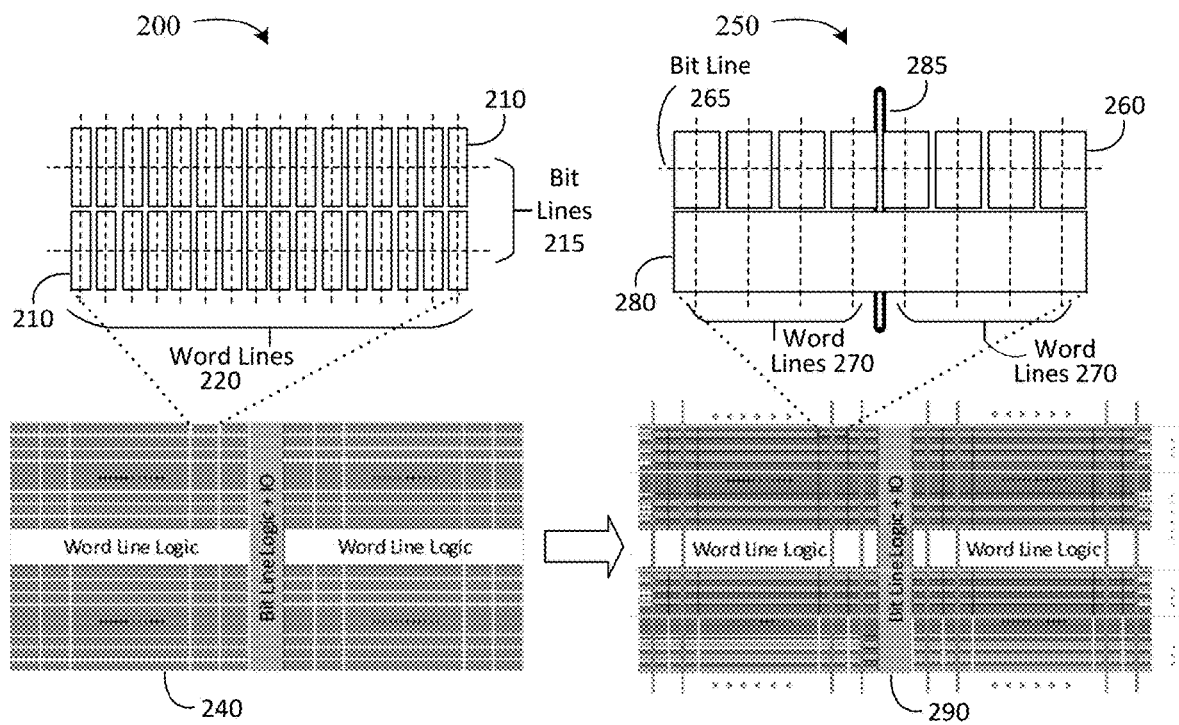
FIG. 2 provides a diagram illustrating an example of converting a generic (e.g., standard) compiled SRAM macro into an SRAM-based in-memory computing macro according to one or more embodiments.

FIG. 2 provides a diagram illustrating an example of converting a generic (e.g., standard) compiled SRAM macro into an SRAM-based in-memory computing macro according to one or more embodiments, with reference to components and features described herein including but not limited to the figures and associated description. As shown in FIG. 2 (left side), an example of a generic (e.g., standard) SRAM macro 200 includes an arrangement of SRAM memory cells 210, one or more bit lines 215, and a plurality of word lines 220. This arrangement of memory cells 210, bit line(s) 215 and word lines 220 is expanded and repeated into a larger array 240 which also includes word line logic, bit line logic and I/O.

On the right side of FIG. 2, an SRAM-based in-memory computing macro 250 includes an arrangement of compute-in-memory SRAM cells 260 along with one or more bit lines 265 and a plurality of word lines 270. In embodiments, the CiM SRAM cells 260 are larger than the SRAM cells 210 (e.g., in embodiments the CiM SRAM cells 260 are 9-transistor CiM SRAM cells such as 9-transistor CiM SRAM cells 125, while the SRAM memory cells 210 are 6-transistor SRAM cells).

The SRAM-based in-memory computing macro 250 also includes C-2C ladder cell(s) (with control logic) 280. This arrangement of CiM SRAM cells 260, bit line(s) 265, word lines 270 and the C-2C ladder cell(s) 280 is expanded and repeated into a larger array 290 which also includes word line logic, bit line logic and I/O. The SRAM-based in-memory computing macro 250 is thus converted from the generic SRAM macro 200, and provides that the bit line logic and SRAM I/O region as well as the word line logic region are all kept intact for this conversion—with the exception that input activation line(s) $IA_n$ 285 and output activation line(s) $OA_n$ (not shown in FIG. 2) are added, which can travel across the regions. Thus, in embodiments one or more bit lines, the bit line logic, a plurality of word lines and the word line logic remain at the same grid locations as provided in the generic SRAM macro.

Thus, for example, the SRAM-based in-memory computing macro 250 uses, to the extent possible, all original bit line, word line and power line grids, as well as the same boundaries as in the original SRAM macro. Because pitch matching is followed, the SRAM control circuitry, including bit line logics, word line logics and I/Os, can all be reused-resulting in benefits of reduced design and development time. In embodiments, some bit line(s) and/or word line(s) from the generic SRAM macro 200 are deleted or repurposed. For example, as illustrated in the example of FIG. 2, in embodiments the generic SRAM macro 200 can have twice as many bit line(s) and twice as many word line(s) as are provided in the SRAM-based in-memory computing macro 250.

Figure 3:
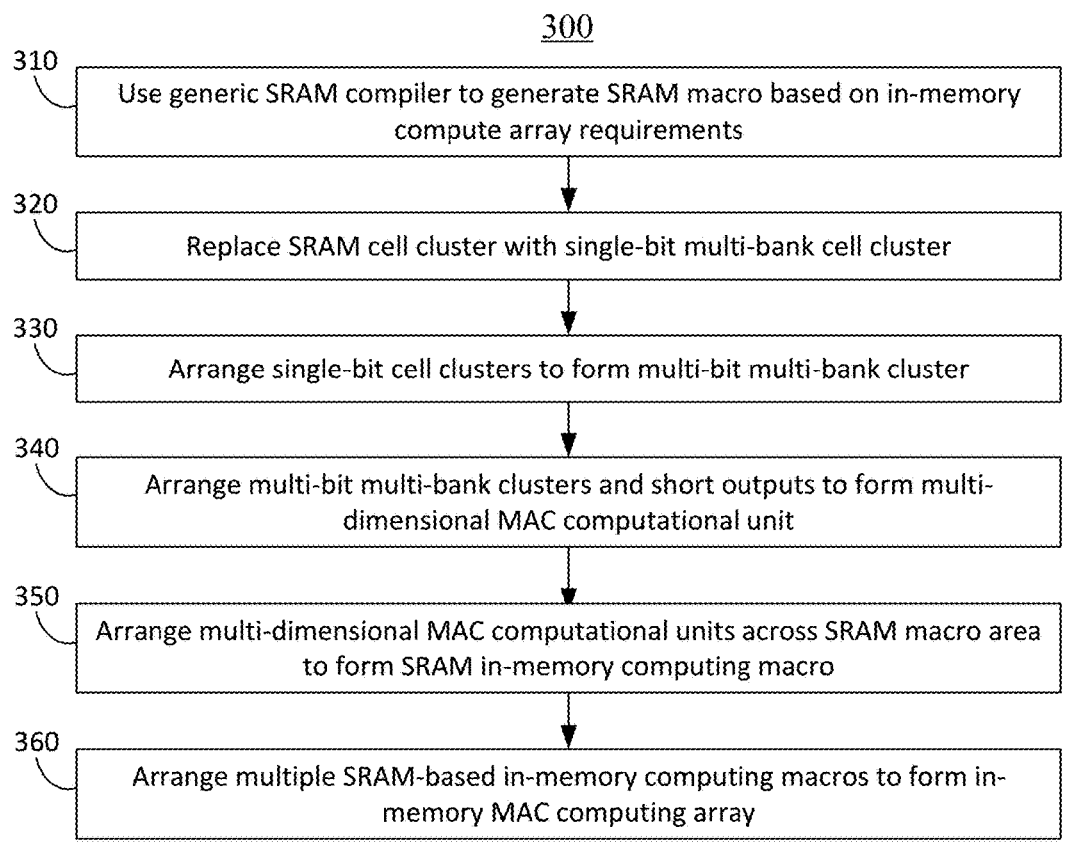
FIG. 3 provides a flow diagram illustrating an example of a process of generating an SRAM-based in-memory computing macro according to one or more embodiments.

FIG. 3 provides a flow diagram illustrating an example of a process 300 for generating an SRAM-based in-memory computing macro according to one or more embodiments, with reference to components and features described herein including but not limited to the figures and associated description. The process 300 is based on converting a generic compiled SRAM macro to form the SRAM-based in-memory computing macro. The process (method) 300 can generally be implemented in, as part of, or in conjunction with an SRAM macro development system (including, e.g., an SRAM compiler). For example, in embodiments a generic SRAM macro generation tool (with generic SRAM compiler) can be modified or expanded to perform operations of the process 300 by taking the original SRAM macro collaterals and converting them into analog CiM MAC macro building blocks and assembling them into a complete CiM macro. As another example, in some embodiments a generic SRAM macro generation tool (with generic SRAM compiler) can be used to generate a generic SRAM macro (e.g., as per block 310 discussed below), and the remaining operations of process 300 can be implemented in a stand-alone tool to perform the CiM macro conversion (e.g., via automated scripting). As another example, one or more aspects of the process 300 can be performed manually, e.g., in conjunction with a generic or expanded macro generation tool.

More particularly, the process 300 can be implemented in one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), a field programmable gate array (FPGAs), complex programmable logic devices (CPLDs), and general purpose microprocessors (e.g., CPUs). Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out the process 300 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning now to FIG. 3, the process 300 involves converting elements of a generic (e.g., standard) SRAM macro and adding or combining elements to generate an SRAM-based in-memory computing macro. Block 310 provides for using a generic (e.g., standard) SRAM compiler to generate a generic SRAM macro based on in-memory compute array requirements. Based on how large the in-memory computing array needs to be for certain system integration needs, a specific size of a generic SRAM macro can be generated using a generic or standard SRAM compiler, and then converted as described herein to an in-memory computing macro for building the desired in-memory computing array. In embodiments, multiple computing macros can be required to build the entire computing array.

In embodiments, an in-memory computing array is based on the example in-memory computing array 110 (FIG. 1A, already discussed). For example, for such an illustrative computing array there are 64 input activations ($IA_n$) and 16 output activations ($OA_n$) for a total of 2048 8-bit MAC operations with 8-bank memory storage multiplexing. For example, as a potential starting point a compiled SRAM macro can have a total of 128 kb storage. After conversion of such a compiled SRAM macro, in each computing macro there can be 8 banks of weight storage, with each bank having 512 weights in an 8-bit format. Two such macros would be required for building the in-memory computing device using the example in-memory computing array 110.

Figure 4:
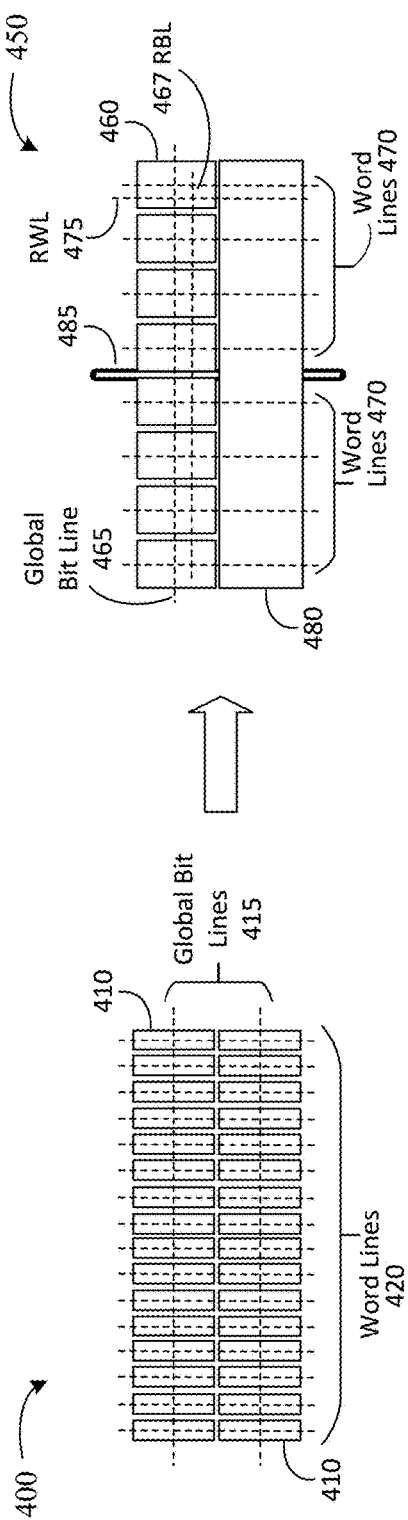
FIG. 4 provides a diagram illustrating a generic SRAM cell cluster from a compiled SRAM macro and an in-memory computing cell cluster after conversion according to one or more embodiments.

Block 320 in FIG. 3 provides for replacing the generic SRAM cell cluster (such as, e.g., the cluster of SRAM memory cells 210 shown in the generic SRAM macro 200 in FIG. 2, already discussed) with a single-bit multi-bank cell cluster (e.g., as shown in the SRAM-based in-memory computing macro 250 in FIG. 2, already discussed). In one example, in accordance with one or more embodiments, FIG. 4 illustrates (on the left side) a generic SRAM cell cluster 400 from a compiled SRAM macro contains 32 6 T SRAM cells 410 in an array of 16×2 cells, with 2 bit lines (BL) 415 and 16 word lines (WL) 420 traversing through this cluster for accessing these 32 SRAM cells. On the right side of FIG. 4 is shown, after conversion, a 1-bit-8-bank cluster 450 (e.g., an in-memory computing cell cluster) including 9 T compute-in-memory SRAM cells 460, a global bit line (BL) 465, a local read bit line (RBL) 467, word lines (WL) 470, local read word lines (RWL) 475, C-2C capacitor ladder cell(s) with control circuits (e.g., logic) 480, and an input activation (IA) line 485.

Per block 320, 6 T SRAM cells in the top half of the cluster 400 are replaced with compute-in-memory SRAM cells (e.g., the 9 T CiM SRAM memory cell 125 in FIG. 1A, already discussed). Because the 9 T CiM SRAM cells are larger (for example, 9 T SRAM cells can be twice the area of a generic or standard 6 T SRAM cell), there is not a one-for-one replacement; in the example of FIG. 4, 16 6 T SRAM cells are replaced with eight 9 T CiM SRAM cells. These eight 9 T CiM SRAM cells form 8 banks of storage for a localized SRAM data multiplexing scheme; they need the 8 read word lines (RWL) 475 for multiplexing control and the local read bit line (RBL) 467 for locally accessing the data for C-2C based MAC computation. In the bottom half of the cluster 400, all the SRAM cells 410 there are removed, which thus eliminates the need for 1 bit line. Then the C-2C capacitor ladder cell(s) with control circuits 480 are fit into this region. The IA line 485 is added to run across this cluster. The result is a 1-bit-8-bank cluster 450. In embodiments, the 1-bit-8-bank cluster 450 corresponds to the 1-bit-8-bank cluster 130 (FIG. 1A, already discussed).

Figure 5:
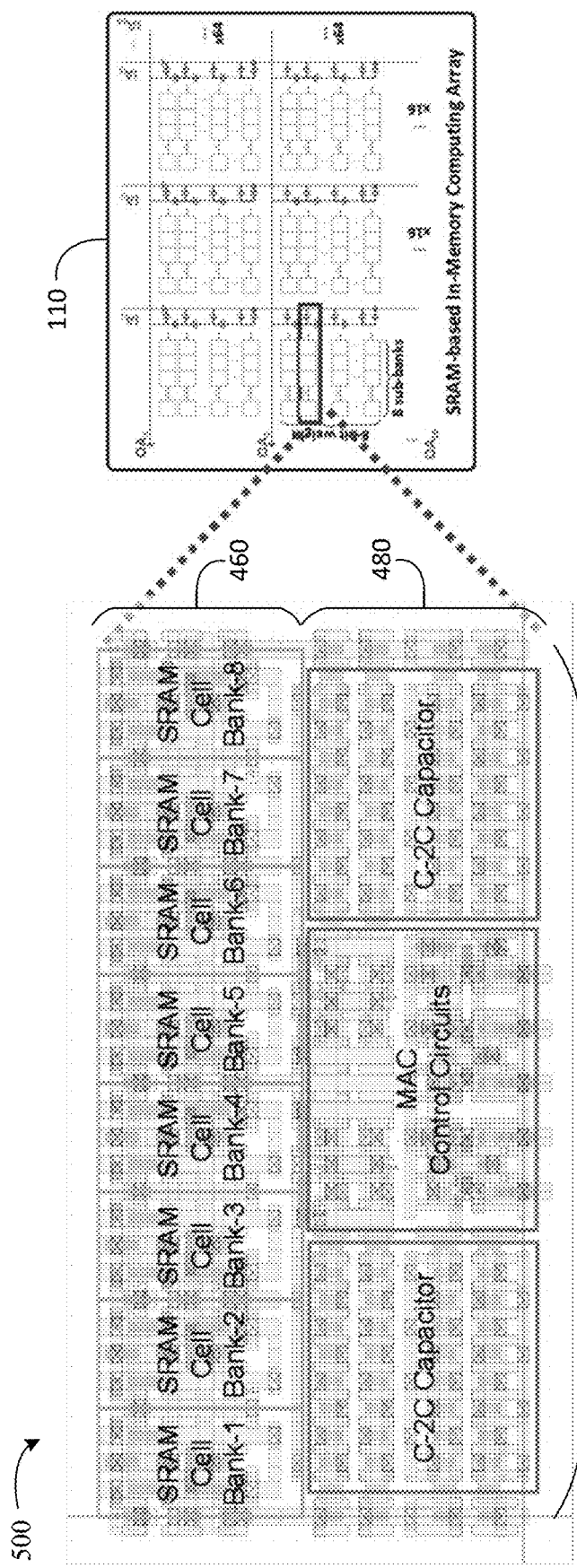
FIG. 5 provides a diagram illustrating an example arrangement of CiM SRAM cells and C-2C capacitor ladder cells with MAC control circuits in a cluster bank based on conversion from a compiled SRAM macro according to one or more embodiments.

After the conversion per block 320, the example 1-bit-8-bank cluster 450 has only 1 BL and 8 WLs left in the cluster, but they all remain in the same position (e.g., same grid locations) as in the original generic SRAM cell cluster 400. In addition, the boundary of the cluster remains unchanged. Thus, the bit lines, word lines and power lines of the SRAM cells remain at their original grids (e.g., as provided by the SRAM macro generation tool) for pitch matching purposes. In one example, in accordance with one or more embodiments, FIG. 5 illustrates an example arrangement of CiM SRAM cells 460 and C-2C capacitor ladder cells with MAC control circuits 480 in a cluster bank 510, based on conversion from a compiled SRAM macro, and further illustrates how the cluster bank 510 relates to the SRAM in-memory computing array 110 (FIG. 1A, already discussed). The cluster bank 510 comprises a 1-bit-8-bank cluster where each CiM SRAM cell provides 1 bit for a bank (bank-1 through bank-8, as illustrated in FIG. 5). In embodiments, the cluster bank 510 corresponds to the 1-bit-8-bank cluster 130 (FIG. 1A, already discussed).

Returning to FIG. 3, block 330 provides for arranging single-bit cell clusters to form a multi-bit multi-bank cluster. In embodiments, arranging single-bit cell clusters includes stacking single-bit cell clusters (e.g., vertically) to form a multi-bit multi-bank cluster. As an example, for 8-bit weight data format, the 8 bits can be denoted $B_0, B_1, \ldots B_6, B_7$, where $B_0$ can represent the most significant bit (MSB) and $B_7$ can represent the least significant bit (LSB). Each bit relates to one 1-bit-8-bank cluster (e.g., a cluster bank 510), and a group of 8 clusters (e.g., each a cluster bank 510) can be denoted as $CB_0, CB_1, CB_2, CB_3, CB_4, CB_5, CB_6$, and $CB_7$. These 1-bit-8-bank clusters ($CB_0, CB_1, \ldots CB_6, CB_7$) can then be stacked vertically to form one single 8-bit-8-bank cluster (such as, e.g., the 8-bit-8-bank cluster 135 in FIG. 1A, already discussed) for multi-bit multi-bank weight storage and IA-weight multiplication. For example, in embodiments the 8-bit-8-bank cluster is configured to mathematically perform the following computation:

$$IA_k \times W_{i,k}^n / 2^8 \quad \text{EQ. (2)}$$

where ($n \in [1 \ldots 8]$, $i \in [1 \ldots 16]$, $k \in [1 \ldots 64]$), and where $IA_k$ is the $k^{th}$ input activation line, and $W_{i,k}^n$ is the selected $n^{th}$ 8-bit weight bank that is from the $i^{th}$ cluster. The $1/2^8$ scaling factor is to normalize the 8-bit weight $W_{i,k}^n$ to a data range of [0, 1]. This multiplication product is summed into one $OA_i$ line, where $OA_i$ is the $i^{th}$ output activation line.

Figure 6:
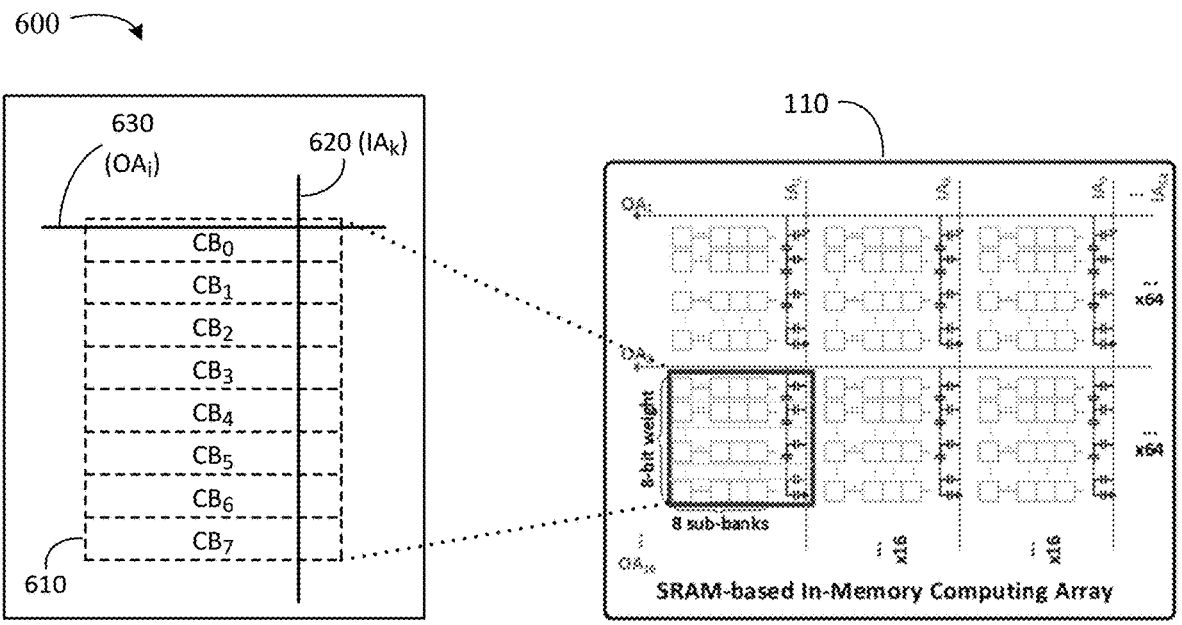
FIG. 6 illustrates an 8-bit-8-bank cluster based on conversion from a compiled SRAM macro according to one or more embodiments.

In one example, in accordance with one or more embodiments, FIG. 6 illustrates an 8-bit-8-bank cluster 600, based on conversion from a compiled SRAM macro, and how it relates to the SRAM in-memory computing array 110 (FIG. 1, already discussed). The 8-bit-8-bank cluster 600 includes 8 stacked 1-bit-8-bank clusters 610 (e.g., clusters $CB_0$, $CB_1, \ldots CB_6, CB_7$), where $CB_0$ represents the MSB and $CB_7$ represents the LSB. In embodiments, each cluster bank 610 corresponds to one cluster bank 510 (FIG. 5, already discussed). In the illustrated example, the only interconnects among those 1-bit-8-bank clusters are the C-2C ladder connections in two neighboring clusters. Additionally, going across the example cluster 600 there is an $IA_k$ line 620 that connects to each of the 8 stacked clusters $CB_0, CB_1, \ldots CB_6$, $CB_7$, and one $OA_i$ line 630 that connects only to cluster $CB_0$.

Figure 7:
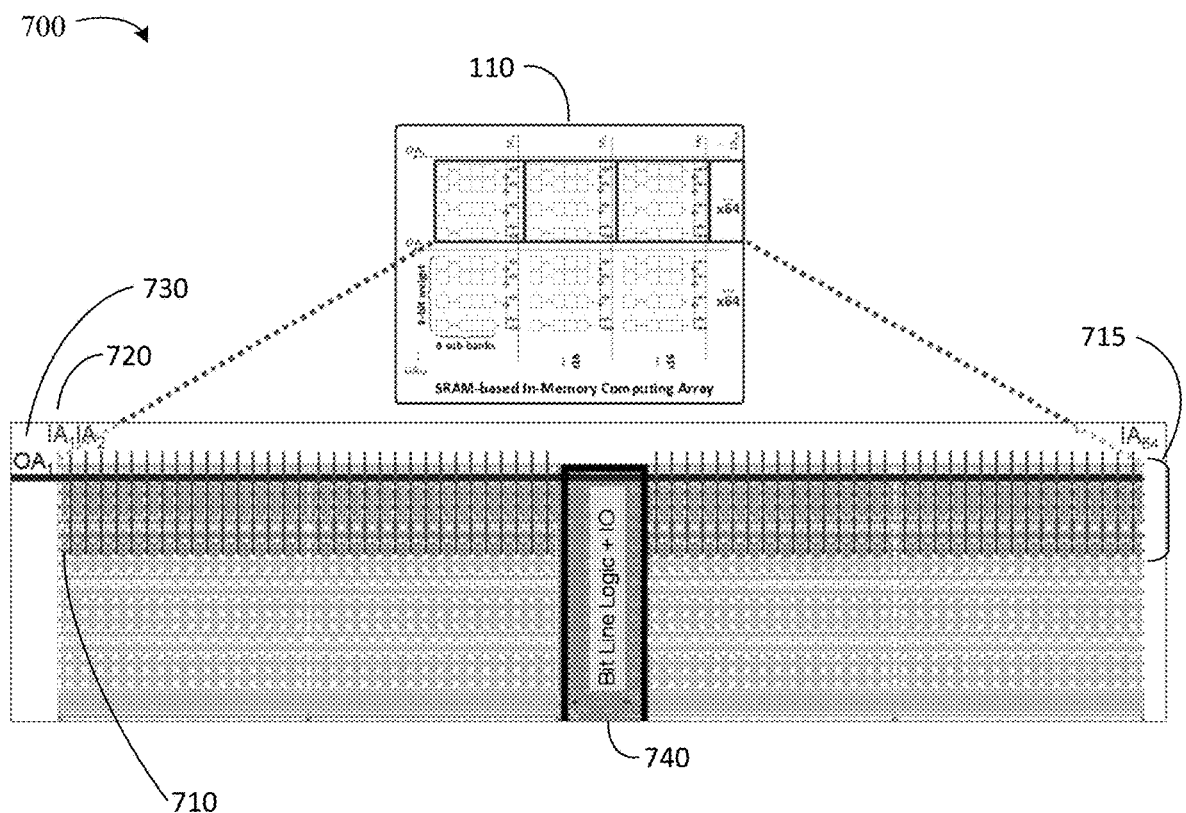
FIG. 7 illustrates an example arrangement of 8-bit-8-bank clusters into a MAC unit based on conversion from a compiled SRAM macro according to one or more embodiments.

Returning to FIG. 3, block 340 provides for arranging multi-bit multi-bank clusters and electrically coupling (e.g., shorting) outputs to form a multi-dimensional MAC computational unit of the defining SRAM in-memory computing macro. In an example, 64 sets of 8-bit-8-bank clusters are connected to a single OA line for a resulting 64-dimensional dot-product computation (e.g., the computation as shown in Eq. (1)), thus forming a 64-D MAC unit. In one example, in accordance with one or more embodiments, FIG. 7 illustrates an example arrangement 700 of 64 sets of 8-bit-8-bank clusters 710 into a 64-D MAC unit 715, based on conversion from a compiled SRAM macro, and further illustrates how the 64-D MAC unit 715 relates to the SRAM in-memory computing array 110 (FIG. 1A, already discussed). The 64 sets of 8-bit-8-bank clusters are stacked horizontally in the illustrated example. In embodiments, each 8-bit-8-bank cluster 710 corresponds to the 8-bit-8-bank cluster 600 (FIG. 6, already discussed).

In the example of FIG. 7, to build the 64-D MAC unit 715 within the scope of compiled SRAM macro, 64 8-bit-8-bank clusters 710 are arrayed horizontally, and 64 IA lines 720 are also spread out horizontally and traversing through the MAC unit 715. In addition, an OA line 730 is coupled to each of the 64 8-bit-8-bank clusters 710. The OA line 730 crosses, but is not connected to, the bit line logic and I/O 740 (shown in the middle in the example). In some embodiments, as an alternative, two separate OA lines 730 can be constructed, with each OA line 730 connecting to 32 sets of 8-bit-8-bank clusters on a respective side of the bit line logic and I/O 740, such that they do not need to cross the bit line logic and I/O 740.

Returning to FIG. 3, block 350 provides for arranging a plurality of multi-dimensional MAC computational units across the SRAM macro area to form an in-memory MAC computing array of the defining SRAM in-memory computing macro. In embodiments, arranging multi-dimensional MAC computational units includes stacking multi-dimensional MAC computational units (e.g., vertically) to form an in-memory MAC computing array.

Figure 8:
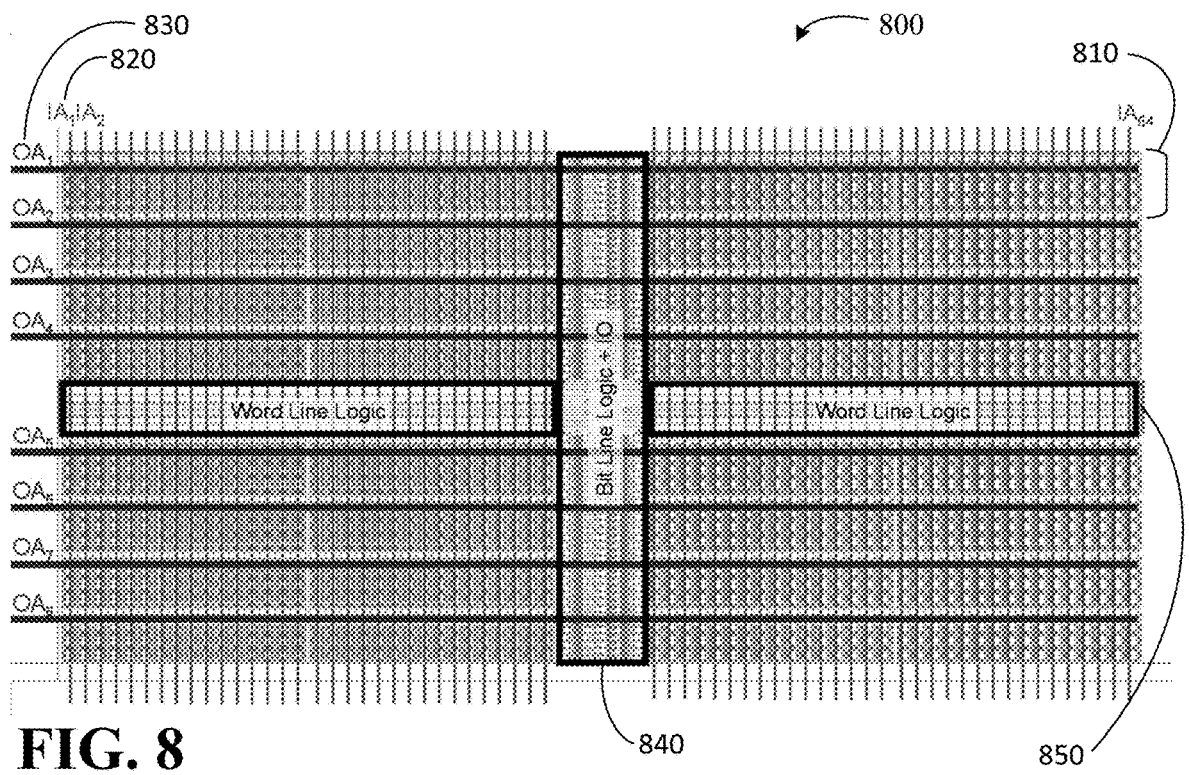
FIG. 8 illustrates an example in-memory MAC computing array of the defining SRAM in-memory computing macro according to one or more embodiments.

In one example, in accordance with one or more embodiments, FIG. 8 illustrates an example in-memory MAC computing array 800 of the defining SRAM in-memory computing macro, having 8 vertically stacked 64-D MAC units 810 within the majority of the SRAM macro area. In embodiments, each 64-D MAC units 810 corresponds to the 64-D MAC unit 715 (FIG. 7, already discussed). The 8 vertically stacked 64-D MAC units 810 include 64 IA lines 820 traversing vertically through the SRAM macro area, and 8 OA lines 830 traversing horizontally through the SRAM macro area.

The example in-memory MAC computing array 800 also includes bit line logic and I/O 840 and word line logic 850, such that the 64-D MAC units 810 are spaced around the word line logic 850. In embodiments a plurality of bit lines, the bit line logic, a plurality of word lines and the word line logic remain at the same grid locations as provided in the generic SRAM macro. Additionally, in embodiments the example in-memory MAC computing array 800 also includes digital-to-analog converters (DACs) (not shown in FIG. 8) and analog-to-digital converters (ADCs) (not shown in FIG. 8) for interfacing incoming input activation lines and outgoing output activation lines, respectively, with a digital system having digital inputs and digital outputs. In embodiments, the example in-memory MAC computing array 800 does not include DACs and ADCs but, instead, incoming input activation lines and outgoing output activation lines are configured to be coupled to DACs and ADCs, respectively.

Returning to FIG. 3, block 360 provides for arranging multiple in-memory MAC computing arrays to form an expanded (e.g., larger) in-memory MAC computing array of the defining SRAM in-memory computing macro. In embodiments, arranging multiple in-memory MAC computing arrays includes stacking multiple in-memory MAC computing arrays to form an expanded in-memory MAC computing array. For example, in embodiments, such as where the desired computing capacity or size exceeds the capacity or size provided by the in-memory MAC computing array, one or more additional in-memory MAC computing arrays can be stacked (e.g., vertically and/or horizontally) to provide an expanded in-memory MAC computing array having the desired in-memory MAC computing capacity or size.

Figure 9:
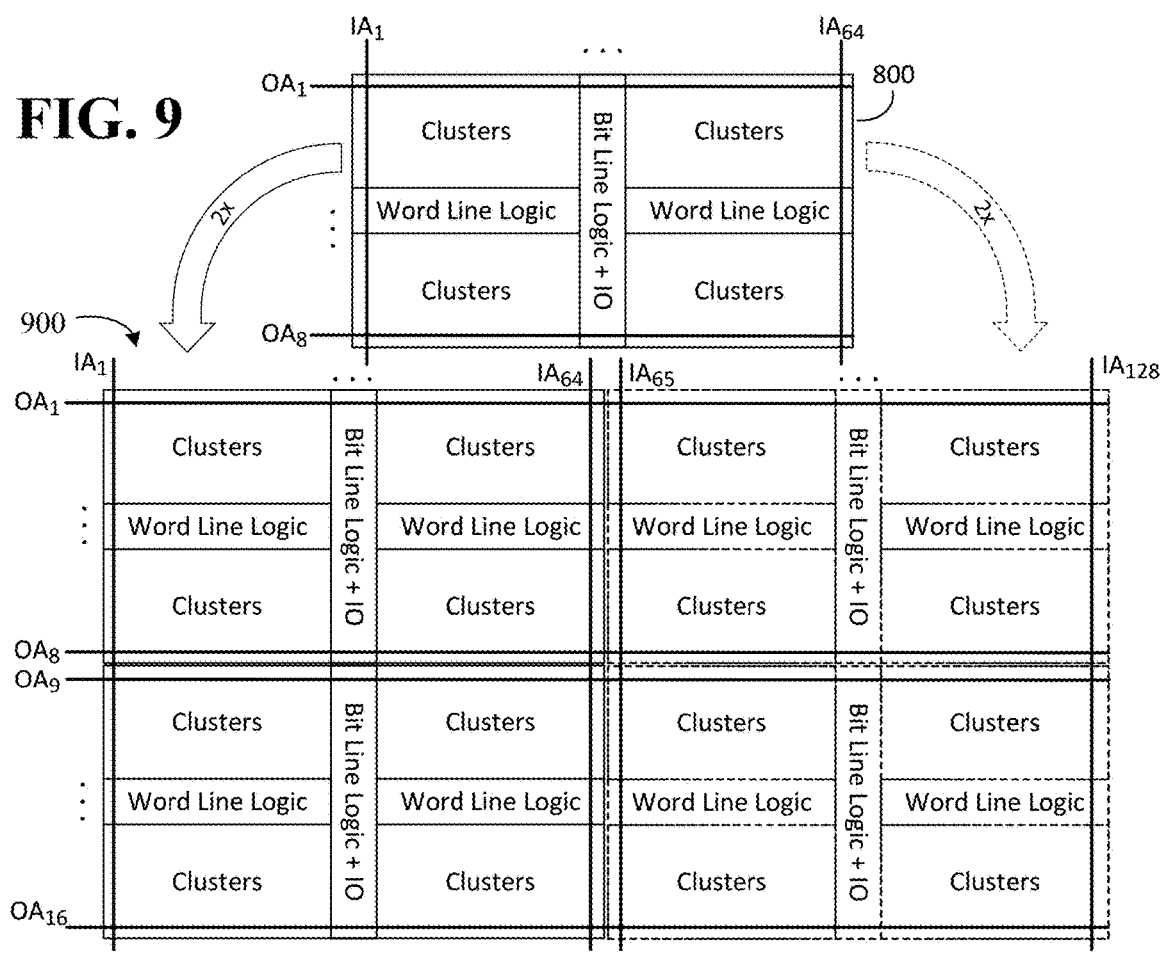
FIG. 9 illustrates an example expanded in-memory MAC computing array of the defining SRAM in-memory computing macro according to one or more embodiments.

In an example, in accordance with one or more embodiments, FIG. 9 illustrates an example expanded in-memory MAC computing array 900 of the defining SRAM in-memory computing macro, built by stacking a plurality of in-memory MAC computing arrays 800 (FIG. 8, already discussed), each in-memory MAC computing array 800 having 8 vertically stacked 64-D MAC units, where each MAC unit includes a plurality of 8-bit-8-bank clusters. For example, in embodiments, the in-memory MAC computing array 800 has 64 IA lines and 8 OA lines, and two in-memory MAC computing arrays 800 are stacked vertically, as shown in FIG. 9, with 64 IA lines and 16 OA lines, along with bit line logic and I/O region(s) and word line logic region(s).

As another example, in embodiments, two in-memory MAC computing arrays 800 are stacked horizontally with 128 IA lines and 8 OA lines, along with bit line logic and I/O region(s) and word line logic region(s). As another example, in embodiments, four in-memory MAC computing arrays 800 are stacked—two vertically, then two more horizontally—as shown in FIG. 9, with 128 IA lines and 16 OA lines, along with bit line logic and I/O region(s) and word line logic region(s). Other arrangements can readily be constructed for differing numbers of units with differing numbers of IA lines and OA lines. As such, as illustrated by these examples and FIG. 9, the SRAM-based in-memory computing macro technology as described herein provides scalability for achieving larger, higher capacity expanded in-memory computing arrays.

It will be understood that the numbers of components, lines, etc. as illustrated in the SRAM-based in-memory computing macro technology of FIGS. 2-9 are shown for illustrative purposes only, and that in embodiments the arrangement and numbers of components, lines etc. can be generalized (e.g., greater or fewer in number, rearranged, etc.) in accordance with the teachings of the disclosure herein. For example, in some embodiments bit line logic and I/O are arranged vertically in a middle region of the SRAM macro, but in other embodiments the bit line logic and I/O are arranged in other regions of the SRAM macro (e.g., on a left side or right side, or top region or bottom region), and/or horizontally instead of vertically. Likewise, in some embodiments word line logic is arranged horizontally in a middle region of the SRAM macro, but in other embodiments the word line logic is arranged in other regions of the SRAM macro (e.g., in a top region or bottom region, or a left side or right side), and/or vertically instead of horizontally.

SRAM-based in-memory computing device(s) defined by the SRAM-based in-memory computing macro as described herein with reference to FIGS. 2-9 can be constructed using a variety of semiconductor fabrication technologies. Such devices can include, for example, a dedicated artificial intelligence (AI) accelerator chip, an ASIC, a CPU chip with AI accelerator, a system-on-chip (SoC), an accelerator in an FPGA platform, a chiplet inside a multi-die package, etc. In embodiments, some or all components of the SRAM-based in-memory computing device(s) defined by the SRAM-based in-memory computing macro as described herein with reference to FIGS. 2-9 are coupled to one or more substrates (not shown in FIGS. 2-9).

Figure 10:
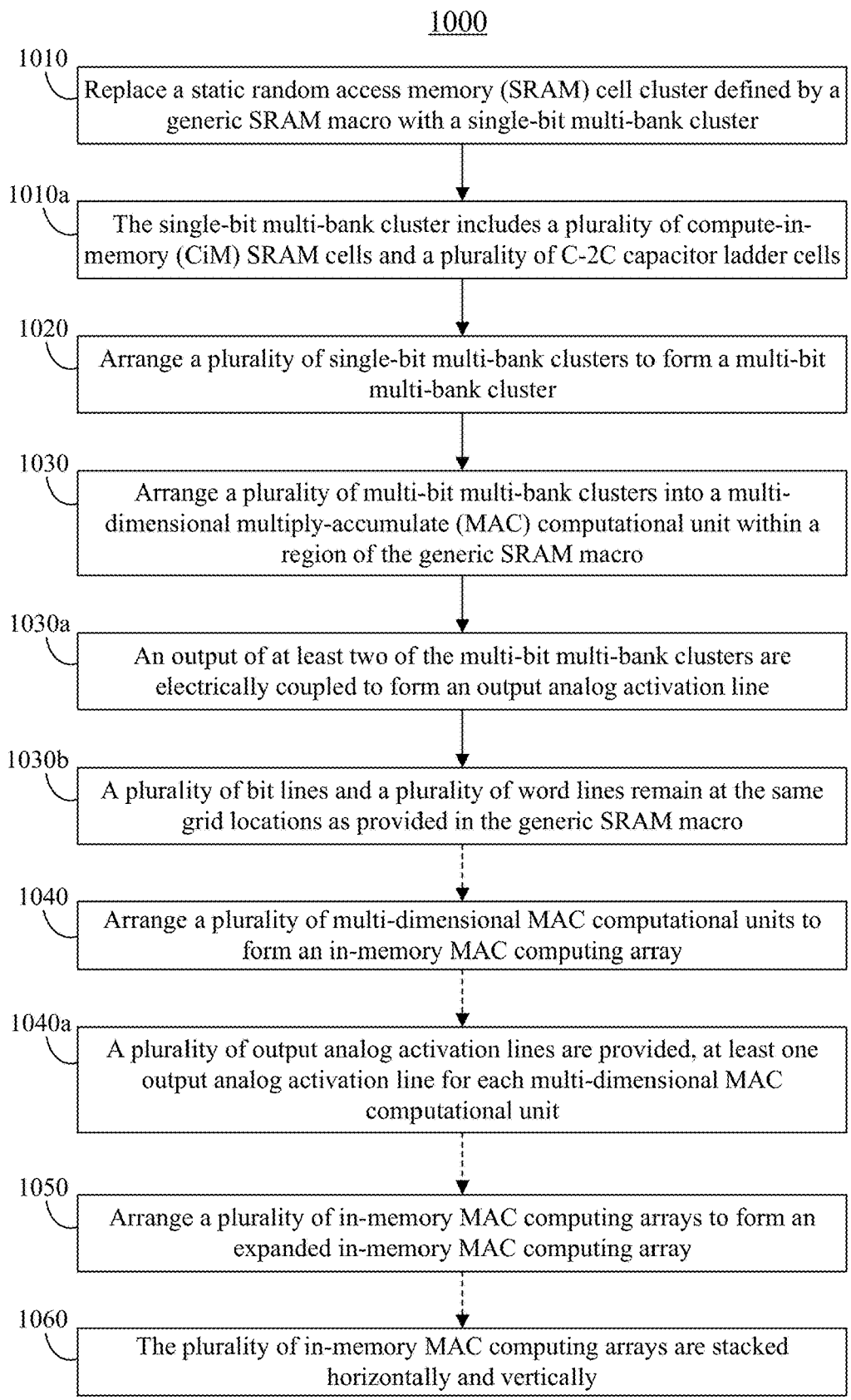
FIG. 10 provides a flow diagram illustrating an example method generating an SRAM-based in-memory computing macro according to one or more embodiments.

FIG. 10 provides a flow diagram illustrating an example method 1000 of generating an SRAM-based in-memory computing macro according to one or more embodiments, with reference to components and features described herein including but not limited to the figures and associated description. The method 1000 is based on converting a generic compiled SRAM macro to form the SRAM-based in-memory computing macro. In embodiments, one or more element(s) of the method 1000 correspond to element(s) of the process 300.

The method 1000 can generally be implemented in, as part of, or in conjunction with a computing system such as, e.g., an SRAM macro development system (including, e.g., an SRAM compiler). More particularly, the method 1000 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 1000 and/or functions associated therewith can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 1010 provides for replacing a static random access memory (SRAM) cell cluster defined by a generic SRAM macro with a single-bit multi-bank cluster, where at block 1010a the single-bit multi-bank cluster includes a plurality of compute-in-memory (CiM) SRAM cells and a plurality of C-2C capacitor ladder cells. In some embodiments, the generic SRAM macro is generated using an SRAM compiler. In some embodiments, the plurality of CiM SRAM cells includes a plurality of 9-transistor CiM SRAM cells. In some embodiments, the C-2C capacitor ladder cells are part of a C-2C ladder array.

Illustrated processing block 1020 provides for arranging a plurality of single-bit multi-bank clusters to form a multi-bit multi-bank cluster. In some embodiments, arranging the plurality of single-bit multi-bank clusters includes stacking the single-bit multi-bank clusters vertically. Illustrated processing block 1030 provides for arranging a plurality of multi-bit multi-bank clusters into a multi-dimensional multiply-accumulate (MAC) computational unit within a region of the generic SRAM macro, where at block 1030*a* an output of at least two of the multi-bit multi-bank clusters are electrically coupled to form an output analog activation line, and where at block 1030*b* a plurality of bit lines and a plurality of word lines remain at the same grid locations as provided in the generic SRAM macro.

In some embodiments, arranging the plurality of multi-bit multi-bank clusters includes stacking the multi-bit multi-bank clusters horizontally. In some embodiments, bit line logic and word line logic remain at the same grid locations as provided in the generic SRAM macro. In some embodiments, a plurality of power lines of the CiM SRAM cells remain at the same grid locations as provided in the generic SRAM macro.

In some embodiments, illustrated processing block 1040 provides for arranging a plurality of multi-dimensional MAC computational units to form an in-memory MAC computing array, where at block 1040*a* a plurality of output analog activation lines are provided, at least one output analog activation line for each multi-dimensional MAC computational unit. In some embodiments, illustrated processing block 1050 provides for arranging a plurality of in-memory MAC computing arrays to form an expanded in-memory MAC computing array. In some embodiments, at illustrated processing block 1060 the plurality of in-memory MAC computing arrays are stacked horizontally and vertically.

Embodiments of each of the above systems, devices, components and/or methods, including the process 300, the process 1000, and/or any other system components, can be implemented in hardware, software, or any suitable combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits. For example, embodiments of each of the above systems, devices, components and/or methods can be implemented via the system 10 (FIG. 11, discussed further below), the semiconductor apparatus 30 (FIG. 12, discussed further below), the processor 40 (FIG. 13, discussed further below), and/or the computing system 60 (FIG. 14, discussed further below).

Alternatively, or additionally, all or portions of the foregoing systems and/or devices and/or components and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 11:
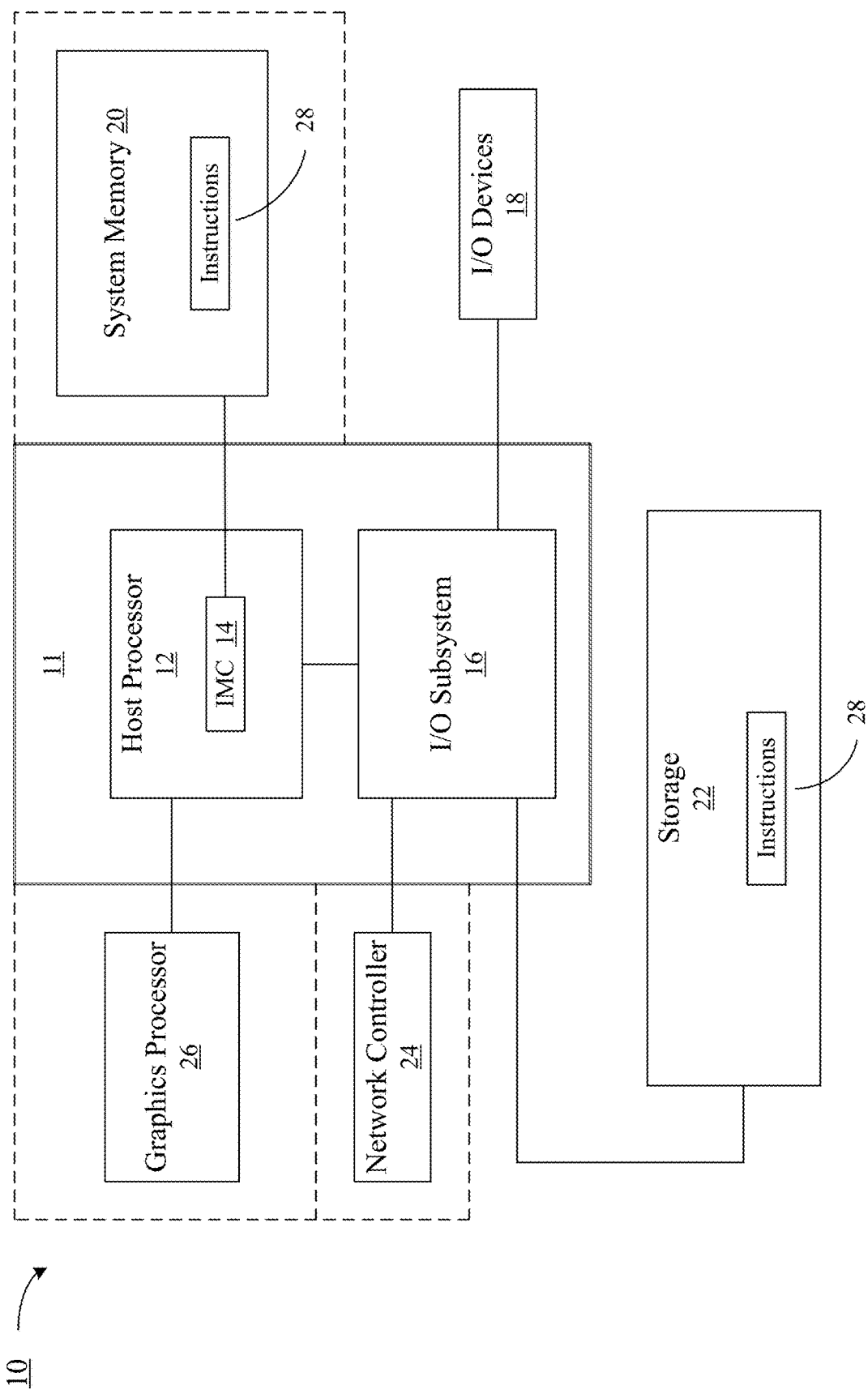
FIG. 11 is a block diagram illustrating an example computing system for generating an SRAM-based in-memory computing macro according to one or more embodiments.

FIG. 11 shows a block diagram illustrating an example computing system 10 for generating an SRAM-based in-memory computing macro according to one or more embodiments, with reference to components and features described herein including but not limited to the figures and associated description. The system 10 can generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 can include a host processor 12 (e.g., central processing unit/CPU) having an integrated memory controller (WIC) 14 that can be coupled to system memory 20. The host processor 12 can include any type of processing device, such as, e.g., microcontroller, microprocessor, RISC processor, ASIC, etc., along with associated processing modules or circuitry. The system memory 20 can include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 can also include an input/output (I/O) subsystem 16. The I/O subsystem 16 can communicate with for example, one or more input/output (I/O) devices 17, a network controller 24 (e.g., wired and/or wireless NIC), and storage 22. The storage 22 can be comprised of any appropriate non-transitory machine- or computer-readable memory type (e.g., flash memory, DRAM, SRAM (static random access memory), solid state drive (SSD), hard disk drive (HDD), optical disk, etc.). The storage 22 can include mass storage. In some embodiments, the host processor 12 and/or the I/O subsystem 16 can communicate with the storage 22 (all or portions thereof) via a network controller 24. In some embodiments, the system 10 can also include a graphics processor 26 (e.g., a graphics processing unit/GPU).

The host processor 12 and the I/O subsystem 16 can be implemented together on a semiconductor die as a system on chip (SoC) 11, shown encased in a solid line. The SoC 11 can therefore operate as a computing apparatus for generating an SRAM-based in-memory computing macro. In some embodiments, the SoC 11 can also include one or more of the system memory 20, the network controller 24, and/or the graphics processor 26 (shown encased in dotted lines). In some embodiments, the SoC 11 can also include other components of the system 10.

The host processor 12 and/or the I/O subsystem 16 can execute program instructions 28 retrieved from the system memory 20 and/or the storage 22 to perform one or more aspects of the process 300 as described herein with reference to FIG. 3 and/or the process 1000 as described herein with reference to FIG. 10. The system 10 can thus implement one or more aspects of the process 300 and/or the process 1000. The system 10 is therefore considered to be performance-enhanced at least to the extent that the technology provides the ability to significantly reduce design and development time and cost for the SRAM-based in-memory computing macro by converting a generic (e.g., standard or traditional) SRAM macro.

Computer program code to carry out the processes described above can be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 can include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

I/O devices 17 can include one or more of input devices, such as a touch-screen, keyboard, mouse, cursor-control device, touch-screen, microphone, digital camera, video recorder, camcorder, biometric scanners and/or sensors; input devices can be used to enter information and interact with system 10 and/or with other devices. The I/O devices 17 can also include one or more of output devices, such as a display (e.g., touch screen, liquid crystal display/LCD, light emitting diode/LED display, plasma panels, etc.), speakers and/or other visual or audio output devices. The input and/or output devices can be used, e.g., to provide a user interface.

Figure 12:
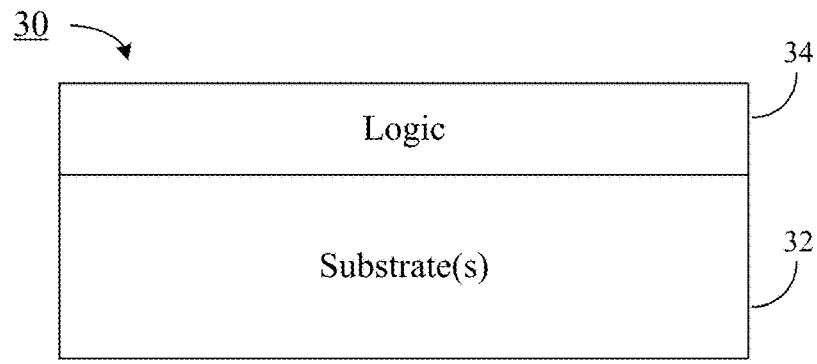
FIG. 12 is a block diagram illustrating an example semiconductor apparatus according to one or more embodiments.

FIG. 12 shows a block diagram illustrating an example semiconductor apparatus 30 for generating an SRAM-based in-memory computing macro according to one or more embodiments, with reference to components and features described herein including but not limited to the figures and associated description. The semiconductor apparatus 30 can be implemented, e.g., as a chip, die, or other semiconductor package. The semiconductor apparatus 30 can include one or more substrates 32 comprised of, e.g., silicon, sapphire, gallium arsenide, etc. The semiconductor apparatus 30 can also include logic 34 comprised of, e.g., transistor array(s) and other integrated circuit (IC) components) coupled to the substrate(s) 32. The logic 34 can be implemented at least partly in configurable logic or fixed-functionality logic hardware. The logic 34 can implement the system on chip (SoC) 11 described above with reference to FIG. 11. The logic 34 can implement one or more aspects of the processes described above, including process 300 and/or process 1000. The apparatus 30 is therefore considered to be performance-enhanced at least to the extent that the technology provides the ability to significantly reduce design and development time and cost for the SRAM-based in-memory computing macro by converting a generic (e.g., standard or traditional) SRAM macro.

The semiconductor apparatus 30 can be constructed using any appropriate semiconductor manufacturing processes or techniques. For example, the logic 34 can include transistor channel regions that are positioned (e.g., embedded) within the substrate(s) 32. Thus, the interface between the logic 34 and the substrate(s) 32 may not be an abrupt junction. The logic 34 can also be considered to include an epitaxial layer that is grown on an initial wafer of the substrate(s) 34.

Figure 13:
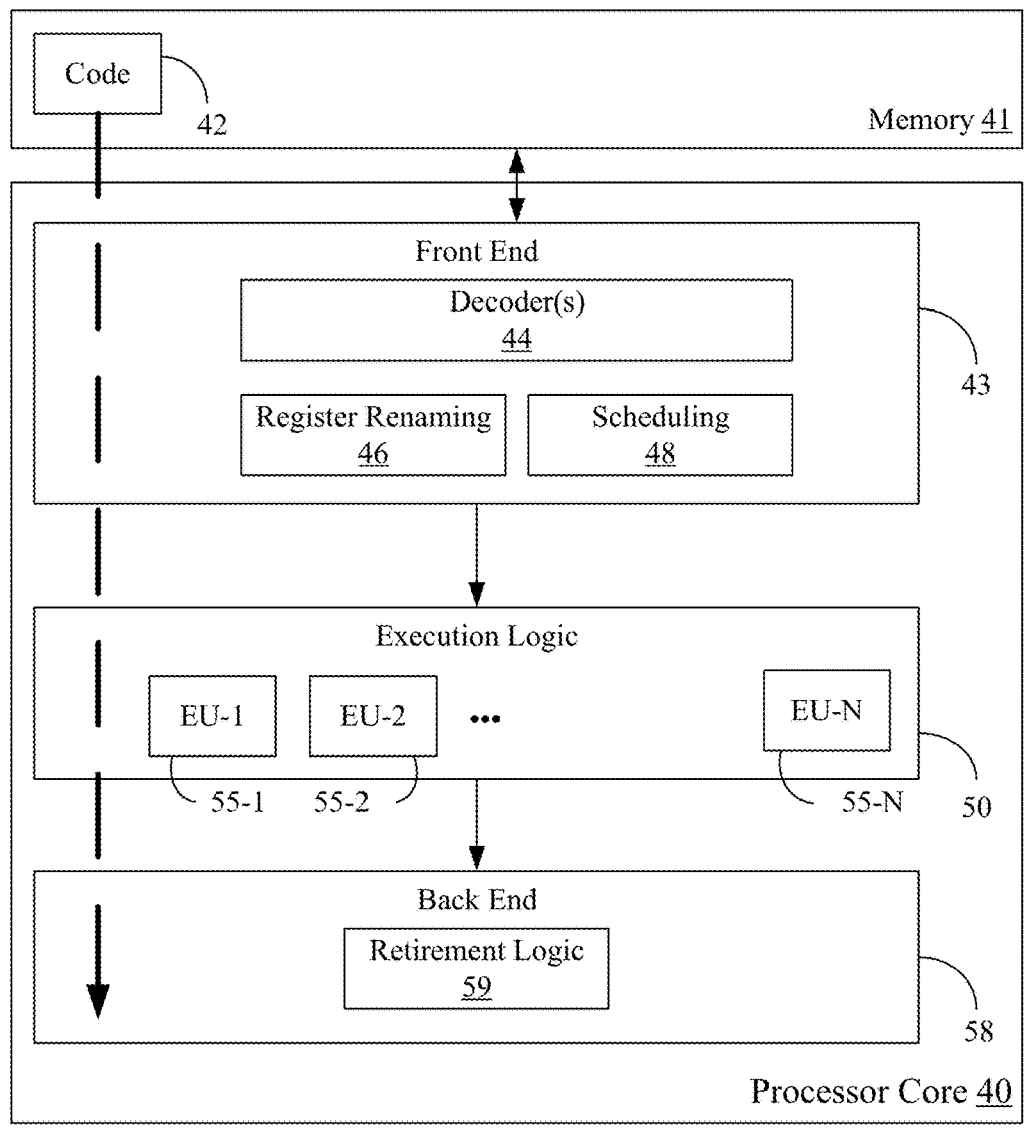
FIG. 13 is a block diagram illustrating an example processor according to one or more embodiments.

FIG. 13 is a block diagram illustrating an example processor core 40 according to one or more embodiments, with reference to components and features described herein including but not limited to the figures and associated description. The processor core 40 can be the core for any type of processor, such as a micro-processor, an embedded processor, a digital signal processor (DSP), a network processor, a graphics processing unit (GPU), or other device to execute code. Although only one processor core 40 is illustrated in FIG. 13, a processing element can alternatively include more than one of the processor core 40 illustrated in FIG. 13. The processor core 40 can be a single-threaded core or, for at least one embodiment, the processor core 40 can be multithreaded in that it can include more than one hardware thread context (or "logical processor") per core.

FIG. 13 also illustrates a memory 41 coupled to the processor core 40. The memory 41 can be any of a wide variety of memories (including various layers of memory hierarchy) as are known or otherwise available to those of skill in the art. The memory 41 can include one or more code 42 instruction(s) to be executed by the processor core 40. The code 42 can implement one or more aspects of the process 300 and/or the process 1000 described above. The processor core 40 can thus implement one or more aspects of the process 300 and/or the process 1000. The processor core 40 can follow a program sequence of instructions indicated by the code 42. Each instruction can enter a front end portion 43 and be processed by one or more decoders 44. The decoder 44 can generate as its output a micro operation such as a fixed width micro operation in a predefined format, or can generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments can include a number of execution units dedicated to specific functions or sets of functions. Other embodiments can include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 can take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 13, a processing element can include other elements on chip with the processor core 40. For example, a processing element can include memory control logic along with the processor core 40. The processing element can include I/O control logic and/or can include I/O control logic integrated with memory control logic. The processing element can also include one or more caches.

FIG. 14 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 can also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 14 can be implemented as a multi-drop bus rather than point-to-point interconnect.

As shown in FIG. 14, each of the processing elements 70 and 80 can be multicore processors, including first and second processor cores (i.e., processor cores 74a and 74b and processor cores 84a and 84b). Such cores 74a, 74b, 84a, 84b can be configured to execute instruction code in a manner similar to that discussed above in connection with FIG. 13.

Each processing element 70, 80 can include at least one shared cache 99a, 99b. The shared cache 99a, 99b can store data (e.g., instructions) that are utilized by one or more components of the processor, such as the cores 74a, 74b and 84a, 84b, respectively. For example, the shared cache 99a, 99b can locally cache data stored in a memory 62, 63 for faster access by components of the processor. In one or more embodiments, the shared cache 99a, 99b can include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments is not so limited. In other embodiments, one or more additional processing elements can be present in a given processor. Alternatively, one or more of the processing elements 70, 80 can be an element other than a processor, such as an accelerator or a field programmable gate array. For example, additional processing element(s) can include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences can effectively manifest themselves as asymmetry and heterogeneity amongst the processing elements 70, 80. For at least one embodiment, the various processing elements 70, 80 can reside in the same die package.

The first processing element 70 can further include memory controller logic (MC) 72 and point-to-point (P-P) interfaces 76 and 78. Similarly, the second processing element 80 can include a MC 82 and P-P interfaces 86 and 88. As shown in FIG. 14, MC's 72 and 82 couple the processors to respective memories, namely a memory 62 and a memory 63, which can be portions of main memory locally attached to the respective processors. While the MC 72 and 82 is illustrated as integrated into the processing elements 70, 80, for alternative embodiments the MC logic can be discrete logic outside the processing elements 70, 80 rather than integrated therein.

The first processing element 70 and the second processing element 80 can be coupled to an I/O subsystem 90 via P-P interconnects 76 and 86, respectively. As shown in FIG. 14, the I/O subsystem 90 includes P-P interfaces 94 and 98. Furthermore, the I/O subsystem 90 includes an interface 92 to couple I/O subsystem 90 with a high performance graphics engine 64. In one embodiment, a bus 73 can be used to couple the graphics engine 64 to the I/O subsystem 90. Alternately, a point-to-point interconnect can couple these components.

In turn, the I/O subsystem 90 can be coupled to a first bus 65 via an interface 96. In one embodiment, the first bus 65 can be a Peripheral Component Interconnect (PCI) bus, or a bus such as a PCI Express bus or another third generation I/O interconnect bus, although the scope of the embodiments are not so limited.

As shown in FIG. 14, various I/O devices 65a (e.g., biometric scanners, speakers, cameras, and/or sensors) can be coupled to the first bus 65, along with a bus bridge 66 which can couple the first bus 65 to a second bus 67. In one embodiment, the second bus 67 can be a low pin count (LPC) bus. Various devices can be coupled to the second bus 67 including, for example, a keyboard/mouse 67a, communication device(s) 67b, and a data storage unit 68 such as a disk drive or other mass storage device which can include code 69, in one embodiment. The illustrated code 69 can implement one or more aspects of the processes described above, including the process 300 and/or the process 1000. The illustrated code 69 can be similar to the code 42 (FIG. 13), already discussed. Further, an audio I/O 67c can be coupled to second bus 67 and a battery 61 can supply power to the computing system 60. The system 60 can thus implement one or more aspects of the process 300 and/or the process 1000.

Note that other embodiments are contemplated. For example, instead of the point-to-point architecture of FIG. 14, a system can implement a multi-drop bus or another such communication topology. Also, the elements of FIG. 14 can alternatively be partitioned using more or fewer integrated chips than shown in FIG. 14.

Additional Notes and Examples

Example 1 includes a performance-enhanced computing system a processor, and memory coupled to the processor, the memory storing instructions which, when executed by the processor, cause the computing system to replace a static random access memory (SRAM) cell cluster defined by a generic SRAM macro with a single-bit multi-bank cluster, the single-bit multi-bank cluster including a plurality of compute-in-memory (CiM) SRAM cells and a plurality of C-2C capacitor ladder cells, arrange a plurality of single-bit multi-bank clusters to form a multi-bit multi-bank cluster, and arrange a plurality of multi-bit multi-bank clusters into a multi-dimensional multiply-accumulate (MAC) computational unit within a region of the generic SRAM macro, where an output of at least two of the multi-bit multi-bank clusters are to be electrically coupled to form an output analog activation line, and where a plurality of bit lines and a plurality of word lines are to remain at the same grid locations as provided in the generic SRAM macro.

Example 2 includes the computing system of Example 1, where the instructions, when executed, cause the computing system to arrange a plurality of multi-dimensional MAC computational units to form an in-memory MAC computing array, where a plurality of output analog activation lines are to be provided, at least one output analog activation line for each multi-dimensional MAC computational unit.

Example 3 includes the computing system of Example 1 or 2, where the instructions, when executed, cause the computing system to arrange a plurality of in-memory MAC computing arrays to form an expanded in-memory MAC computing array.

Example 4 includes the computing system of Example 1, 2 or 3, where the plurality of in-memory MAC computing arrays are to be stacked horizontally and vertically.

Example 5 includes the computing system of any of Examples 1-4, where the plurality of CiM SRAM cells includes a plurality of 9-transistor CiM SRAM cells.

Example 6 includes the computing system of any of Examples 1-5, where bit line logic and word line logic are to remain at the same grid locations as provided in the generic SRAM macro.

Example 7 includes the computing system of any of Examples 1-6, where a plurality of power lines of the CiM SRAM cells are to remain at the same grid locations as provided in the generic SRAM macro, where arranging the plurality of single-bit multi-bank clusters includes stacking the single-bit multi-bank clusters vertically, and where arranging the plurality of multi-bit multi-bank clusters includes stacking the multi-bit multi-bank clusters horizontally.

Example 8 includes at least one computer readable storage medium comprising a set of instructions which, when executed by a computing system, cause the computing system to replace a static random access memory (SRAM) cell cluster defined by a generic SRAM macro with a single-bit multi-bank cluster, the single-bit multi-bank cluster including a plurality of compute-in-memory (CiM) SRAM cells and a plurality of C-2C capacitor ladder cells, arrange a plurality of single-bit multi-bank clusters to form a multi-bit multi-bank cluster, and arrange a plurality of multi-bit multi-bank clusters into a multi-dimensional multiply-accumulate (MAC) computational unit within a region of the generic SRAM macro, where an output of at least two of the multi-bit multi-bank clusters are to be electrically coupled to form an output analog activation line, and where a plurality of bit lines and a plurality of word lines are to remain at the same grid locations as provided in the generic SRAM macro.

Example 9 includes the at least one computer readable storage medium of Example 8, where the instructions, when executed, cause the computing system to arrange a plurality of multi-dimensional MAC computational units to form an in-memory MAC computing array, where a plurality of output analog activation lines are to be provided, at least one output analog activation line for each multi-dimensional MAC computational unit.

Example 10 includes the at least one computer readable storage medium of Example 8 or 9, where the instructions, when executed, cause the computing system to arrange a plurality of in-memory MAC computing arrays to form an expanded in-memory MAC computing array.

Example 11 includes the at least one computer readable storage medium of Example 8, 9 or 10, where the plurality of in-memory MAC computing arrays are to be stacked horizontally and vertically.

Example 12 includes the at least one computer readable storage medium of any of Examples 8-11, where the plurality of CiM SRAM cells includes a plurality of 9-transistor CiM SRAM cells.

Example 13 includes the at least one computer readable storage medium of any of Examples 8-12, where bit line logic and word line logic are to remain at the same grid locations as provided in the generic SRAM macro.

Example 14 includes the at least one computer readable storage medium of any of Examples 8-13, where a plurality of power lines of the CiM SRAM cells are to remain at the same grid locations as provided in the generic SRAM macro, where arranging the plurality of single-bit multi-bank clusters includes stacking the single-bit multi-bank clusters vertically, and where arranging the plurality of multi-bit multi-bank clusters includes stacking the multi-bit multi-bank clusters horizontally.

Example 15 includes a method comprising replacing a static random access memory (SRAM) cell cluster defined by a generic SRAM macro with a single-bit multi-bank cluster, the single-bit multi-bank cluster including a plurality of compute-in-memory (CiM) SRAM cells and a plurality of C-2C capacitor ladder cells, arranging a plurality of single-bit multi-bank clusters to form a multi-bit multi-bank cluster, and arranging a plurality of multi-bit multi-bank clusters into a multi-dimensional multiply-accumulate (MAC) computational unit within a region of the generic SRAM macro, where an output of at least two of the multi-bit multi-bank clusters are electrically coupled to form an output analog activation line, and where a plurality of bit lines and a plurality of word lines remain at the same grid locations as provided in the generic SRAM macro.

Example 16 includes the method of Example 15, further comprising arranging a plurality of multi-dimensional MAC computational units to form an in-memory MAC computing array, where a plurality of output analog activation lines are provided, at least one output analog activation line for each multi-dimensional MAC computational unit.

Example 17 includes the method of Example 15 or 16, further comprising arranging a plurality of in-memory MAC computing arrays to form an expanded in-memory MAC computing array.

Example 18 includes the method of Example 15, 16 or 17, where the plurality of in-memory MAC computing arrays are stacked horizontally and vertically.

Example 19 includes the method of any of Examples 15-18, where the plurality of CiM SRAM cells includes a plurality of 9-transistor CiM SRAM cells.

Example 20 includes the method of any of Examples 15-19, where bit line logic and word line logic remain at the same grid locations as provided in the generic SRAM macro.

Example 21 includes the method of any of Examples 15-20, where a plurality of power lines of the CiM SRAM cells remain at the same grid locations as provided in the generic SRAM macro, where arranging the plurality of single-bit multi-bank clusters includes stacking the single-bit multi-bank clusters vertically, and where arranging the plurality of multi-bit multi-bank clusters includes stacking the multi-bit multi-bank clusters horizontally.

Example 22 includes a semiconductor apparatus comprising one or more substrates, and an in-memory multiply-accumulate (MAC) computing array coupled to the one or more substrates, the in-memory MAC computing array to perform simultaneous multiply-accumulate operations with multibit data, the in-memory MAC computing array comprising a plurality of multi-dimensional MAC computational units arranged in one or more of a horizontal formation or a vertical formation, each multi-dimensional MAC computational unit comprising a plurality of multi-bit multi-bank clusters electrically coupled to an output analog activation line, each multi-bit multi-bank cluster comprising a plurality of compute-in-memory (CiM) cells and a C-2C ladder array electrically coupled to a respective input analog activation line, where each respective input activation line is electrically coupled to a corresponding multi-bit multi-bank cluster in each of the plurality of multi-dimensional MAC computational units.

Example 23 includes the apparatus of Example 22, where the plurality of CiM cells comprises a plurality of 9-transistor memory cells.

Example 24 includes the apparatus of Example 22 or 23, where the apparatus includes a plurality of in-memory MAC computing arrays coupled to the one or more substrates to form an expanded in-memory MAC computing array.

Example 25 includes the apparatus of Example 22, 23 or 24, where the plurality of in-memory MAC computing arrays are stacked horizontally and vertically.

Example 26 includes an apparatus comprising means for performing the method of any of Examples 15 to 21.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system, comprising:
   a processor; and
   memory coupled to the processor, the memory storing instructions which, when executed by the processor, cause the computing system to:
   replace a static random access memory (SRAM) cell cluster defined by a generic SRAM macro with a single-bit multi-bank cluster, the single-bit multi-bank cluster including a plurality of compute-in-memory (CiM) SRAM cells and a plurality of C-2C capacitor ladder cells;
   arrange a plurality of single-bit multi-bank clusters to form a multi-bit multi-bank cluster; and
   arrange a plurality of multi-bit multi-bank clusters into a multi-dimensional multiply-accumulate (MAC) computational unit within a region of the generic SRAM macro,
   wherein an output of at least two of the multi-bit multi-bank clusters are to be electrically coupled to form an output analog activation line, and wherein a plurality of bit lines and a plurality of word lines are to remain at the same grid locations as provided in the generic SRAM macro.

2. The system of claim 1, wherein the instructions, when executed, cause the computing system to arrange a plurality of multi-dimensional MAC computational units to form an in-memory MAC computing array, wherein a plurality of output analog activation lines are to be provided, at least one output analog activation line for each multi-dimensional MAC computational unit.

3. The system of claim 2, wherein the instructions, when executed, cause the computing system to arrange a plurality of in-memory MAC computing arrays to form an expanded in-memory MAC computing array.

4. The system of claim 3, wherein the plurality of in-memory MAC computing arrays are to be stacked horizontally and vertically.

5. The system of claim 1, wherein the plurality of CiM SRAM cells includes a plurality of 9-transistor CiM SRAM cells.

6. The system of claim 1, wherein bit line logic and word line logic are to remain at the same grid locations as provided in the generic SRAM macro.

7. The system of claim 6, wherein a plurality of power lines of the CiM SRAM cells are to remain at the same grid locations as provided in the generic SRAM macro, wherein arranging the plurality of single-bit multi-bank clusters includes stacking the single-bit multi-bank clusters vertically, and wherein arranging the plurality of multi-bit multi-bank clusters includes stacking the multi-bit multi-bank clusters horizontally.

8. At least one computer readable storage medium comprising a set of instructions which, when executed by a computing system, cause the computing system to:

replace a static random access memory (SRAM) cell cluster defined by a generic SRAM macro with a single-bit multi-bank cluster, the single-bit multi-bank cluster including a plurality of compute-in-memory (CiM) SRAM cells and a plurality of C-2C capacitor ladder cells;

arrange a plurality of single-bit multi-bank clusters to form a multi-bit multi-bank cluster; and arrange a plurality of multi-bit multi-bank clusters into a multi-dimensional multiply-accumulate (MAC) computational unit within a region of the generic SRAM macro, wherein an output of at least two of the multi-bit multi-bank clusters are to be electrically coupled to form an output analog activation line, and wherein a plurality of bit lines and a plurality of word lines are to remain at the same grid locations as provided in the generic SRAM macro.

9. The at least one computer readable storage medium of claim 8, wherein the instructions, when executed, cause the computing system to arrange a plurality of multi-dimensional MAC computational units to form an in-memory MAC computing array, wherein a plurality of output analog activation lines are to be provided, at least one output analog activation line for each multi-dimensional MAC computational unit.

10. The at least one computer readable storage medium of claim 9, wherein the instructions, when executed, cause the computing system to arrange a plurality of in-memory MAC computing arrays to form an expanded in-memory MAC computing array.

11. The at least one computer readable storage medium of claim 10, wherein the plurality of in-memory MAC computing arrays are to be stacked horizontally and vertically.

12. The at least one computer readable storage medium of claim 8, wherein the plurality of CiM SRAM cells includes a plurality of 9-transistor CiM SRAM cells.

13. The at least one computer readable storage medium of claim 8, wherein bit line logic and word line logic are to remain at the same grid locations as provided in the generic SRAM macro.

14. The at least one computer readable storage medium of claim 13, wherein a plurality of power lines of the CiM SRAM cells are to remain at the same grid locations as provided in the generic SRAM macro, wherein arranging the plurality of single-bit multi-bank clusters includes stacking the single-bit multi-bank clusters vertically, and wherein arranging the plurality of multi-bit multi-bank clusters includes stacking the multi-bit multi-bank clusters horizontally.

15. A method comprising:

replacing a static random access memory (SRAM) cell cluster defined by a generic SRAM macro with a single-bit multi-bank cluster, the single-bit multi-bank cluster including a plurality of compute-in-memory (CiM) SRAM cells and a plurality of C-2C capacitor ladder cells;

arranging a plurality of single-bit multi-bank clusters to form a multi-bit multi-bank cluster; and arranging a plurality of multi-bit multi-bank clusters into a multi-dimensional multiply-accumulate (MAC) computational unit within a region of the generic SRAM macro, wherein an output of at least two of the multi-bit multi-bank clusters are electrically coupled to form an output analog activation line, and wherein a plurality of bit lines and a plurality of word lines remain at the same grid locations as provided in the generic SRAM macro.

16. The method of claim 15, further comprising arranging a plurality of multi-dimensional MAC computational units to form an in-memory MAC computing array, wherein a plurality of output analog activation lines are provided, at least one output analog activation line for each multi-dimensional MAC computational unit.

17. The method of claim 16, further comprising arranging a plurality of in-memory MAC computing arrays to form an expanded in-memory MAC computing array.

18. The method of claim 17, wherein the plurality of in-memory MAC computing arrays are stacked horizontally and vertically.

19. The method of claim 15, wherein the plurality of CiM SRAM cells includes a plurality of 9-transistor CiM SRAM cells.

20. The method of claim 15, wherein bit line logic and word line logic remain at the same grid locations as provided in the generic SRAM macro.

21. The method of claim 20, wherein a plurality of power lines of the CiM SRAM cells remain at the same grid locations as provided in the generic SRAM macro, wherein arranging the plurality of single-bit multi-bank clusters includes stacking the single-bit multi-bank clusters vertically, and wherein arranging the plurality of multi-bit multi-bank clusters includes stacking the multi-bit multi-bank clusters horizontally.

22. A semiconductor apparatus comprising:

one or more substrates; and an in-memory multiply-accumulate (MAC) computing array coupled to the one or more substrates, the in-memory MAC computing array to perform simultaneous multiply-accumulate operations with multibit data, the in-memory MAC computing array comprising:

a plurality of multi-dimensional MAC computational units arranged in one or more of a horizontal formation or a vertical formation, each multi-dimensional MAC computational unit comprising a plurality of multi-bit multi-bank clusters electrically coupled to an output analog activation line, each multi-bit multi-bank cluster comprising a plurality of compute-in-memory (CiM) cells and a C-2C ladder array electrically coupled to a respective input analog activation line, wherein each respective input activation line is electrically coupled to a corresponding multi-bit multi-bank cluster in each of the plurality of multi-dimensional MAC computational units.

23. The apparatus of claim 22, wherein the plurality of CiM cells comprises a plurality of 9-transistor memory cells.

24. The apparatus of claim 22, wherein the apparatus includes a plurality of in-memory MAC computing arrays coupled to the one or more substrates to form an expanded in-memory MAC computing array.

25. The apparatus of claim 24, wherein the plurality of in-memory MAC computing arrays are stacked horizontally and vertically.

* * * * *